United States Patent
Li et al.

(10) Patent No.: US 11,565,247 B2
(45) Date of Patent: Jan. 31, 2023

(54) CATALYST COMPOSITIONS INCLUDING METAL CHALCOGENIDES, PROCESSES FOR FORMING THE CATALYST COMPOSITIONS, AND USES THEREOF

(71) Applicants: Honda Motor Co., Ltd., Tokyo (JP); The Trustees of Columbia University in the City of New York, New York, NY (US)

(72) Inventors: Xufan Li, Fremont, CA (US); Avetik Harutyunyan, Santa Clara, CA (US); Xiangye Liu, Xi'an (CN); Baiching Li, New York, NY (US); James Curtis Hone, New York, NY (US); Daniel V. Esposito, New York, NY (US)

(73) Assignees: HONDA MOTOR CO., LTD., Tokyo (JP); THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 142 days.

(21) Appl. No.: 17/199,129

(22) Filed: Mar. 11, 2021

(65) Prior Publication Data
US 2022/0288576 A1   Sep. 15, 2022

(51) Int. Cl.
*B01J 37/34* (2006.01)
*B01J 27/043* (2006.01)
(Continued)

(52) U.S. Cl.
CPC ........... *B01J 37/344* (2013.01); *B01J 27/043* (2013.01); *B01J 27/051* (2013.01);
(Continued)

(58) Field of Classification Search
CPC .... B01J 27/043; B01J 27/051; B01J 27/0573; B01J 27/0576; B01J 37/344; C25B 1/04; C25B 11/075; Y02E 60/36; Y02P 20/133
See application file for complete search history.

(56) References Cited

U.S. PATENT DOCUMENTS 4,722,986 A * 2/1988 Young ................... C05C 9/00
                                                         502/215
10,832,906 B2   11/2020   Li et al.

OTHER PUBLICATIONS

Greeley, J.; Jaramillo, T. F.; Bonde, J.; Chorkendorff, I.; Nørskov, J. K. Nature Materials, May 2006, (11), 909-913.
(Continued)

*Primary Examiner* — Brian A McCaig
(74) *Attorney, Agent, or Firm* — Patterson + Sheridan, LLP

(57) ABSTRACT

Aspects of the present disclosure generally relate to catalyst compositions including metal chalcogenides, processes for producing such catalyst compositions, processes for enhancing catalytic active sites in such catalyst compositions, and uses of such catalyst compositions in, e.g., processes for producing conversion products. In an aspect, a process for forming a catalyst composition is provided. The process includes introducing an electrolyte material and an amphiphile material to a metal chalcogenide to form the catalyst composition. In another aspect, a catalyst composition is provided. The catalyst composition includes a metal chalcogenide, an electrolyte material, and an amphiphile material. Devices for hydrogen evolution reaction are also provided.

20 Claims, 9 Drawing Sheets

(51) Int. Cl.
  *B01J 27/051* (2006.01)
  *C25B 11/075* (2021.01)
  *B01J 27/057* (2006.01)
  *C25B 1/04* (2021.01)

(52) U.S. Cl.
  CPC ....... *B01J 27/0573* (2013.01); *B01J 27/0576* (2013.01); *C25B 1/04* (2013.01); *C25B 11/075* (2021.01)

(56) References Cited

OTHER PUBLICATIONS

Morales-Guio, C. G.; Stem, L.-A.; Hu, X. Chemical Society reviews 2014, 43, (18), 6555-6569.
Jiao, Y.; Zheng, Y.; Jaroniec, M.; Qiao, S. Z. Chemical Society reviews 2015, 44, (8), 2060-2086.
Zhu, D. D.; Liu, J. L.; Qiao, S. Z. Adv Mater 2016, 28, (18), 3423-52.
Qiao, J.; Liu, Y.; Hong, F.; Zhang, J. Chemical Society reviews 2014, 43, (2), 631-75.
Zhang, W.; Hu, Y.; Ma, L.; Zhu, G.; Wang, Y.; Xue, X.; Chen, R.; Yang, S.; Jin, Z. Advanced Science, May 2017, (1), 1700275.
Hinnemann, B.; Moses, P. G.; Bonde, J.; Jørgensen, K. P.; Nørskov, J. K. J Am Chem Soc 2005, 127, (15), 5308-5309.
Voiry, D.; Yang, J.; Chhowalla, M. Adv Mater 2016, 28, (29), 6197-6206.
Benck, J. D.; Hellstern, T. R.; Kibsgaard, J.; Chakthranont, P.; Jaramillo, T. F. ACS Catalysis, Apr. 2014, (11), 3957-3971.
Jaramillo, T. F.; Jørgensen, K. P.; Bonde, J.; Nielsen, J. H.; Horch, S.; Chorkendorff, I. Science 2007, 317, (5834), 100-102.
Qi, D.; Bo, S.; Ping, X.; Song, J. Chem, Jan. 2016, (5), 699-726.
Voiry, D.; Fullon, R.; Yang, J.; e Silva, C. d. C. C.; Kappera, R.; Bozkurt, I.; Kaplan, D.; Lagos, M. J.; Batson, P. E.; Gupta, G. Nature materials 2016, 15, (9), 1003.
Li H, T. C., Koh AL, Cai L, Contryman AW, Fragapane AH, Zhao J, Han HS, Manoharan HC, Abild-Pedersen F, Nørskov JK . . . Nature Materials 2016, 15, (1), 48-53.
Tsai, C.; Chan, K.; Nørskov, J. K.; Abild-Pedersen, F. Surf Sci 2015, 640, 133-140.
Yang, J.; Wang, Y.; Lagos, M. J.; Manichev, V.; Fullon, R.; Song, X.; Voiry, D.; Chakraborty, S.; Zhang, W.; Batson, P. E. ACS Nano 2019, 13, (9), 9958-9964.
Ye, G.; Gong, Y.; Lin, J.; Li, B.; He, Y.; Pantelides, S. T.; Zhou, W.; Vajtai, R.; Ajayan, P. M. Nano Lett 2016, 16, (2), 1097-103.
Li, G.; Zhang, D.; Qiao, Q.; Yu, Y.; Peterson, D.; Zafar, A.; Kumar, R.; Curtarolo, S.; Hunte, F.; Shannon, S.; Zhu, Y.; Yang, W.; Cao, L. J Am Chem Soc 2016, 138, (51), 16632-16638.
Xie, J.; Zhang, H.; Li, S.; Wang, R.; Sun, X.; Zhou, M.; Zhou, J.; Lou, X. W.; Xie, Y. Adv Mater 2013, 25, (40), 5807-5813.
Huang, Y.; Nielsen, R. J.; Goddard III, W. A. J Am Chem Soc 2018, 140, (48), 16773-16782.
Kim, K. Y.; Lee, J.; Kang, S.; Son, Y.-W.; Jang, H. W.; Kang, Y.; Han, S. ACS Catalysis, Aug. 2018, (5), 4508-4515.
Choi, H. H.; Cho, K.; Frisbie, C. D.; Sirringhaus, H.; Podzorov, V. J. N. m. Nature materials 2017, 17, (1), 2.
Hu, S., .; Lozada-Hidalgo, M., .; Wang, F. C.; Mishchenko, A., .; Schedin, F., .; Nair, R. R.; Hill, E. W.; Boukhvalov, D. W.; Katsnelson, M. I.; Dryfe, R. A. W. Nature 2014, 516, (7530), 227-230.
Bockris, J. M.; Potter, E. J Electrochem Soc 1952, 99, (4), 169-186.
Moosavi-Movahedi, A. A.; Gharanfoli, M.; Nazari, K.; Shamsipur, M.; Chamani, J.; Hemmateenejad, B.; Alavi, M.; Shokrollahi, A.; Habibi-Rezaei, M.; Sorenson, C. Colloids & Surfaces B Biointerfaces 2005, 43, (3), 150-157.
Ahn, H. S.; Bard, A. J. J Phys Chem Lett, Jul. 2016, (14), 2748.
Li, G.; Zhang, D.; Yu, Y.; Huang, S.; Yang, W.; Cao, L. J Am Chem Soc 2017, 139, (45), 16194-16200.
Amani, M.; Lien, D.-H.; Kiriya, D.; Xiao, J.; Azcatl, A.; Noh, J.; Madhvapathy, S. R.; Addou, R.; Santosh, K.; Dubey, M. Science 2015, 350, (6264), 1065-1068.
Park, J. H.; Sanne, A.; Guo, Y.; Amani, M.; Zhang, K.; Hep, M.; Robinson, J. A.; Javey, A.; Robertson, J.; Banerjee, S. K. Science Advances, Mar. 2017, (10), e1701661.
Ji, W.; Zhao, Y.; Fahad, H. M.; Bullock, J.; Allen, T.; Lien, D.-H.; De Wolf, S.; Javey, A. ACS Nano 2019, 13, (3), 3723-3729.
Bullock, J.; Kiriya, D.; Grant, N. E.; Azcatl, A.; Hettick, M.; Kho, T.; Phang, P.; Sio, H. C.; Yan, D.; Macdonald, D. ACS applied materials & interfaces, Aug. 2016, (36), 24205.
Pointon, A. I.; Grant, N. E.; Wheeler-Jones, E. C.; Altermatt, P. P.; Murphy, J. D. Solar Energy Materials & Solar Cells 2018, 183, 164-172.
Lee, H.; Bak, S.; Cho, Y.; Kim, M.; Kang, S. H.; Bui, V. Q.; Le, H. M.; Kim, S. W.; Lee, H. NPG Asia Materials 2018.
Tsai, C.; Li, H.; Park, S.; Park, J.; Han, H. S.; Norskov, J. K.; Zheng, X.; Abild-Pedersen, F. Nat Commun, Aug. 2017, 15113.
Liu, Y.; Wu, J.; Hackenberg, K. P.; Zhang, J.; Wang, Y. M.; Yang, Y.; Keyshar, K.; Gu, J.; Ogitsu, T.; Vajtai, R.; Lou, J.; Ajayan, P. M.; Wood, Brandon C.; Yakobson, B. I. Nature Energy, Feb. 2017, (9).
Henckel, D. A.; Lenz, O. M.; Krishnan, K. M.; Cossairt, B. M. Nano Lett 2018, 18, (4), 2329-2335.
Liu, X.; Li, B.; Li, X.; Harutyunyan, A. R.; Hone, J.; Esposito, D. V. Nano Lett 2019, 19, (11), 8118-8124.
Zhang, J.; Wu, J.; Guo, H.; Chen, W.; Yuan, J.; Martinez, U.; Gupta, G.; Mohite, A.; Ajayan, P. M.; Lou, J. Adv Mater 2017, 29, (42), 1701955.
Radisavljevic, B.; Radenovic, A.; Brivio, J.; Giacometti, i. V.; Kis, A. Nature nanotechnology, Jun. 2011, (3), 147.
Lu, H.; Kummel, A.; Robertson, J. APL Materials, Jun. 2018, (6), 066104.
Manne, S.; Gaub, H. E. Science 1995, 270, (5241), 1480-1482.
Mouri, S.; Miyauchi, Y.; Matsuda, K. Nano Lett 2013, 13, (12), 5944-5948.
Su, W.; Jin, L.; Qu, X.; Huo, D.; Yang, L. Phys Chem Chem Phys 2016, 18, (20), 14001-14006.
Nan, H.; Wang, Z.; Wang, W.; Liang, Z.; Lu, Y.; Chen, Q.; He, D.; Tan, P.; Miao, F.; Wang, X. ACS Nano, Aug. 2014, (6), 5738-5745.
McGlynn, J. C.; Dankwort, T.; Kienle, L.; Bandeira, N. A.; Fraser, J. P.; Gibson, E. K.; Cascallana-Matías, I.; Kamarás, K.; Symes, M. D.; Miras, H. N. J. N. c. Nat Commun, Oct. 2019, (1), 1-9.
Chen, M.; Burgess, I.; Lipkowski, J. Surf Sci 2009, 603, (10), 1878-1891.
Sun, J.; Wang, Y.; Guo, S.; Wan, B.; Dong, L.; Gu, Y.; Song, C.; Pan, C.; Zhang, Q.; Gu, L. J. A. M. Adv Mater 2020, 1906499.
Li, X.; Kahn, E.; Chen, G.; Sang, X.; Lei, J.; Passarello, D.; Oyedele, A. D.; Zakhidov, D.; Chen, K.-W.; Chen, Y.-X.; Hsieh, S.-H.; Fujisawa, K.; Unocic, R. R.; Xiao, K.; Salleo, A.; Toney, M. F.; Chen, C.-H.; Kaxiras, E.; Terrones, M.; Yakobson, B. I.; and Harutyunyan, A. R. ACS Nano 2020, doi.org/10.1021/acsnano.0c00132.

\* cited by examiner

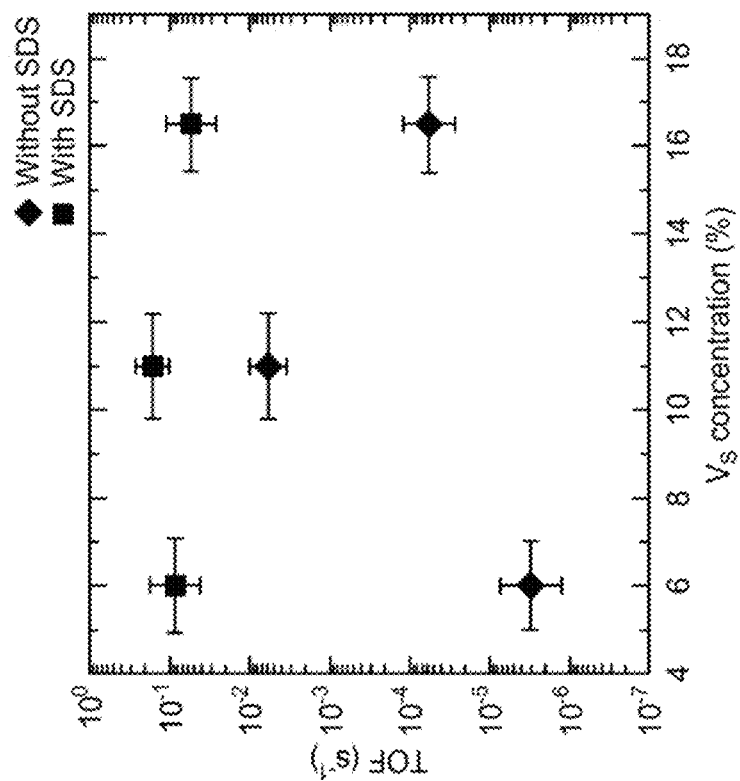
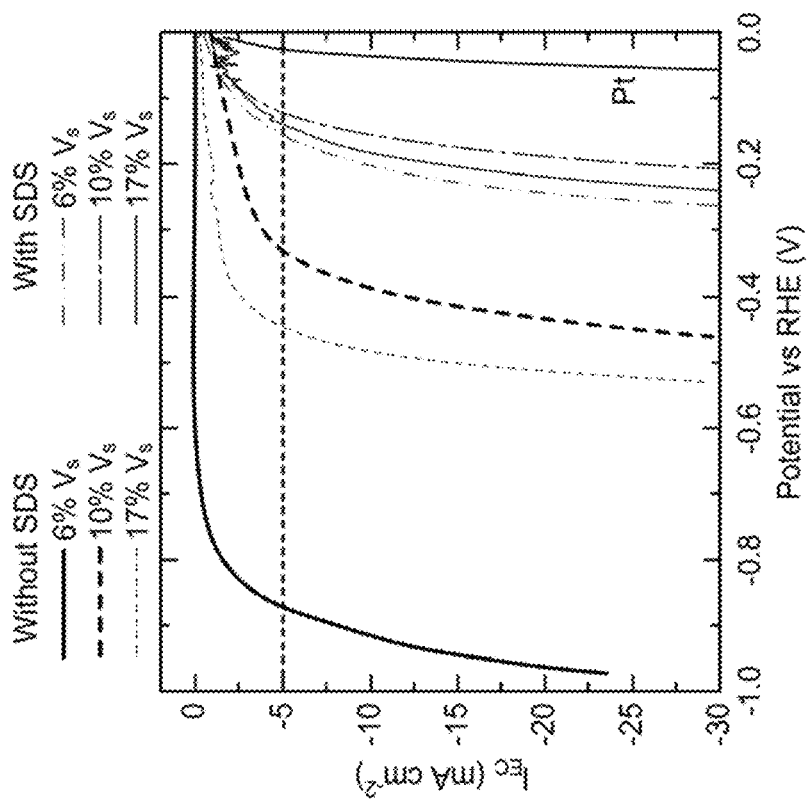
FIG. 6B
FIG. 6A

CATALYST COMPOSITIONS INCLUDING METAL CHALCOGENIDES, PROCESSES FOR FORMING THE CATALYST COMPOSITIONS, AND USES THEREOF

STATEMENT REGARDING FEDERALLY SPONSORED RESEARCH OR DEVELOPMENT

This invention was made with government support under 1420634 awarded by the National Science Foundation. The government has certain rights in the invention.

FIELD

Aspects of the present disclosure generally relate to catalyst compositions including metal chalcogenides, processes for producing such catalyst compositions, processes for enhancing catalytic active sites in such catalyst compositions, and uses of such catalyst compositions in, e.g., processes for producing conversion products.

BACKGROUND

Electrochemical reduction of water and carbon dioxide ($CO_2$) is an efficient way to convert $CO_2$ and water to energy-rich products. Various precious metal catalysts can reduce these materials; however, with the implementation of renewable energy technologies, the development of inexpensive systems having efficient electrochemical catalytic reduction capabilities, and made from earth-abundant materials, remains a challenge. One such system receiving significant interest as catalysts includes the family of two-dimensional (2D) transition metal chalcogenides. As a specific example, molybdenum disulfide ($MoS_2$) has emerged as a catalyst for hydrogen evolution from the electrolysis of water, due to, e.g., its favorable hydrogen binding energy at edge sites, its excellent stability, and its precious metal-free composition. However, the hydrogen evolution reaction (HER) activity of 2H—$MoS_2$, the most energetically stable phase of $MoS_2$, is limited by its electrochemically-inert basal planes. Chalcogen vacancies ($V_C$), such as sulfur vacancies ($V_S$) specifically for $MoS_2$, are active catalytic sites that can be introduced into the $MoS_2$ basal plane. However, even with deliberate introduction of high vacancy density, the practical HER activities of 2D $MoS_2$ are still far below the level of precious metal catalysts.

There is a need for new and improved processes for producing metal chalcogenides having, e.g., higher electro-catalytic activity.

SUMMARY

Aspects of the present disclosure generally relate to catalyst compositions including metal chalcogenides, processes for producing such catalyst compositions, processes for enhancing catalytic active sites in such catalyst compositions, and uses of such catalyst compositions in, e.g., processes for producing conversion products.

In an aspect, a process for forming a catalyst composition is provided. The process includes introducing an electrolyte material and an amphiphile material to a metal chalcogenide to form the catalyst composition.

In another aspect, a catalyst composition is provided. The catalyst composition includes a metal chalcogenide, an electrolyte material, and an amphiphile material.

In another aspect, a process for converting water to a conversion product is provided. The process includes introducing an aqueous electrolyte material and an aqueous amphiphile material to a metal chalcogenide to form a mixture comprising a catalyst composition, the aqueous electrolyte material comprising an acid having a pKa of about 3 or less as determined by potentiometry. The process further includes introducing a voltage to the catalyst composition to form the conversion product.

In another aspect, a device for hydrogen evolution reaction is provided. The device includes an aqueous electrolyte material, an aqueous amphiphile material, and a multilayer structure. The multilayer structure includes a substrate, a source electrode and a drain electrode disposed on at least a portion of the substrate, and a metal chalcogenide disposed on at least a portion of the source electrode and at least a portion of the drain electrode.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

FIG. 6A shows exemplary data of HER current (electrochemical current, $I_{EC}$) as a function of potential versus reversible hydrogen electrode (RHE) for example ML $MoS_2$ flakes with different $V_S$ concentrations in sulfuric acid ($H_2SO_4$) electrolyte with sodium dodecyl sulfate (SDS) and without SDS according to at least one aspect of the present disclosure.

FIG. 6B shows exemplary turnover frequency data for example ML $MoS_2$ flakes with different $V_S$ concentrations in $H_2SO_4$ electrolyte with and without SDS according to at least one aspect of the present disclosure.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

Aspects of the present disclosure generally relate to catalyst compositions including metal chalcogenides, processes for producing such catalyst compositions, processes for enhancing catalytic active sites in such catalyst compositions, and uses of such catalyst compositions in, e.g., processes for producing conversion products. The inventors have found processes for controlling and enhancing, e.g., the electrocatalytic activity of metal chalcogenides, as well as catalyst compositions that are improved over conventional methods and compositions. Briefly, and in some examples, the electrocatalytic activity enhancement of metal chalcogenides is performed by utilizing an electrolyte material and a molecular mediator material (e.g., amphiphile materials/compounds that are negatively charged in solution). The electrolyte material and molecular mediator material promote hydrogen coverage at chalcogen atom vacancies (V$_C$). Aspects described herein show, e.g., the role of hydrogen-coverage (H-coverage) in determining the HER activity of individual chalcogen atom vacancies, and these H-adsorbed chalcogen atom vacancies can exhibit different catalytic properties than chalcogen atom vacancies without hydrogen.

Figure 1A:
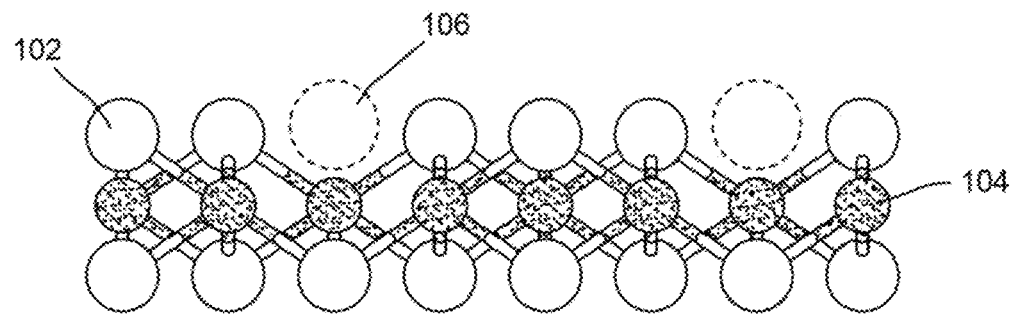
FIG. 1A is a pictorial representation of an example of monolayer (ML) $MoS_2$ structure showing sulfur vacancy ($V_S$) sites.
Figure 1B:
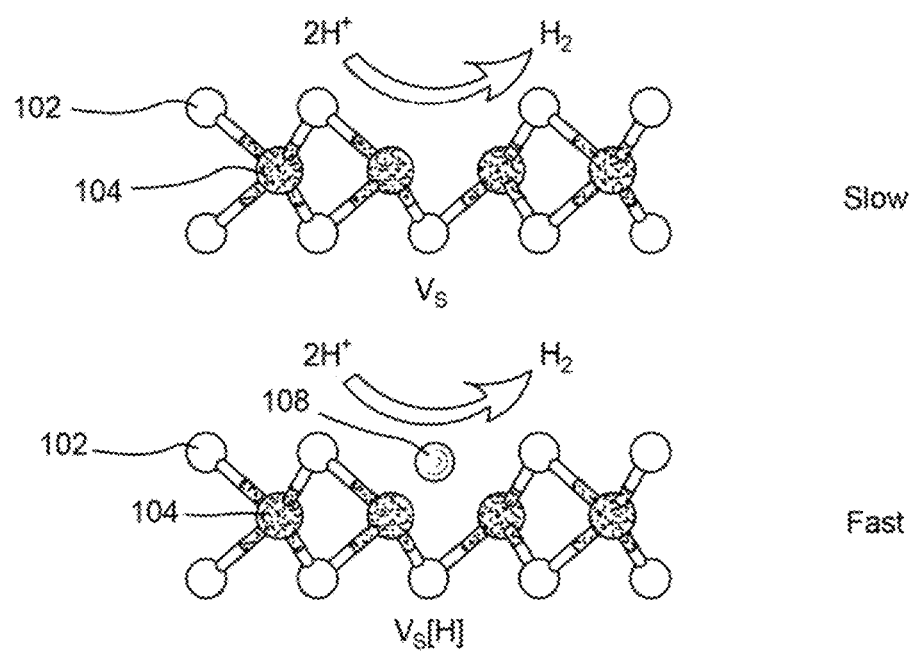
FIG. 1B is a schematic illustration of slow and fast hydrogen evolution reaction kinetics at $V_S$ (top panel) and hydrogen-adsorbed $V_S$ ($V_S[H]$) (bottom panel).

As a non-limiting example, FIG. 1A shows a pictorial representation of the sulfur atom vacancy (V$_S$) sites 106 for an example monolayer (ML) MoS$_2$ structure (Mo=104; S=102). As described herein, it was found that the use of an amphiphile material with an electrolyte material increases the hydrogen coverage at the V$_S$ sites and significantly reduces the energy barrier of the Volmer reaction:

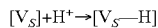

at V$_S$ sites in the monolayer MoS$_2$ basal plane, resulting in a much improved catalytic activity of the active sites. Aspects described herein show the role of hydrogen-coverage (H-coverage) in determining the HER activity of an individual V$_S$ site, and the H-adsorbed V$_S$ (bottom panel) can exhibit faster HER kinetics than bare V$_S$ (top panel) as illustrated in FIG. 1B. In FIG. 1B, the hydrogen atom is represented by numeral 108. Similar Volmer reactions occur with other metal chalcogenides, such that chalcogen atom vacancies can benefit from the use of an electrolyte material and an amphiphile material.

In some examples, and when an acid electrolyte is used, the hydrogen atoms adsorbed at chalcogen atom vacancies, V$_C$, originate from hydronium ions (H$^3$O$^+$). Charged species located at the metal chalcogenide surface can mediate the interaction between the hydronium ions and V$_C$. These positively charged ions on the metal chalcogenide surface could repulse the hydronium ions away from the V$_C$, while negatively charged ions could strengthen the affinity of hydronium at the V$_C$. However, the use of molecular mediators can control this repulsion/affinity. Here, while not wishing to be bound by theory, it is believed that molecular mediators (e.g., amphiphilic compounds (and their ions)) can self-assemble at the metal chalcogenide surface. This self-assembly of molecular mediators at the metal chalcogenide surface can serve to control the H-adsorption/desorption processes and tune the H-coverage at V$_C$ sites, leading to enhanced HER activity of the metal chalcogenide. For example, and for MoS$_2$, the molecular mediator material enhances the HER activity of the 2H—MoS$_2$ basal plane. In some examples, the molecular mediator material improves the HER activity of the metal chalcogenide (e.g., the 2H—MoS$_2$ basal planes), such that the catalyst compositions exhibit large decreases in overpotential and large increases in turnover frequency (TOF).

Processes of the present disclosure can provide catalyst compositions having, e.g., higher catalytic activity than conventional methods. The catalyst compositions prepared by processes of the present disclosure are also different from those prepared by conventional methods. For example, the catalyst compositions include one or more amphiphile materials and one or more electrolyte materials to, e.g., control the activity of the metal chalcogenides.

Compared to conventionally-made metal chalcogenides, the improved properties of catalyst compositions described can provide for their use in various applications. For example, the catalyst compositions of the present disclosure can be employed as catalysts for hydrogen evolution reactions.

Catalyst Compositions

Aspects of the present disclosure generally relate to catalyst compositions useful for conversion reactions such as electrocatalytic conversion reactions. An illustrative, but non-limiting, example of an electrocatalytic conversion reaction is the conversion of water into hydrogen via hydrogen evolution reactions. According to some aspects, the catalyst compositions include three or more components.

The first component includes one or more metal chalcogenides. The one or more metal chalcogenides include one or more metals from Group 3 to Group 14 of the periodic table of elements and one or more elements (e.g., one or more non-metal elements and/or metalloids) from Group 16 of the periodic table of elements. The one or more metal chalcogenides can be represented by the formula $$ME_2,$$

wherein:

M is a Group 3 to Group 14 metal, such as titanium (Ti), zirconium (Zr), hafnium (Hf), vanadium (V), niobium (Nb), tantalum (Ta), chromium (Cr), molybdenum (Mo), tungsten (W), manganese (Mn), technetium, rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), cadmium (Cd), mercury (Hg), gallium (Ga), indium (In), thallium (Tl), tin (Sn), lead (Pb), or combinations thereof, such as Mo, W, Nb, Ni, Fe, V, Cr, Mn, or combinations thereof; and E is a Group 16 element, such as sulfur (S), selenium (Se), tellurium (Te), or combinations thereof.

Illustrative, but non-limiting, examples of metal chalcogenides include $MoS_2$, $NbSe_2$, $TiS_2$, $ZrS_2$, $HfS_2$, $TaS_2$, $TeS_2$, $ReS_2$, $PtS_2$, $SnS_2$, $SnSe_2$, $TiSe_2$, $ZrSe_2$, $HfSe_2$, $VSe_2$, $TaSe_2$, $TeSe_2$, $ReSe_2$, $PtSe_2$, $TiTe_2$, $ZrTe_2$, $VTe_2$, $NbTe_2$, $TaTe_2$, $WTe_2$, $CoTe_2$, $RhTe_2$, $IrTe_2$, $NiTe_2$, $PdTe_2$, $PtTe_2$, $SiTe_2$, $NbS_2$, $WS_2$, $MoSe_2$, $WSe_2$, $MoTe_2$, and combinations thereof. In some aspects, M is a Group 3 to Group 10 metal of the periodic table of elements.

The one or more metal chalcogenides have chalcogen atom vacancies, $V_C$. In some aspects, a density of chalcogen atom vacancies refers to a number of chalcogen atom sites not occupied by chalcogen atoms per 100 chalcogen atom sites. For example, if there are 100 chalcogen atom sites that chalcogen atoms are supposed to occupy, and 10 chalcogen atom sites are not occupied, a density of chalcogen atom vacancies is 10%. In some aspects, the density of chalcogen atom vacancies is more than about 1%, such as about 5% or more, such as from about 5% to about 30%, such as from about 10% to about 20% or from about 5% to about 15%. As a non-limiting example, $MoS_2$ has sulfur vacancies (or sulfur atom vacancies), $V_S$, that relate to, e.g., the catalytic properties of $MoS_2$. In at least one aspect, the density of chalcogen atom vacancies of the metal chalcogenide, alone, is from about 0% to about 30%, such as from about 4% to about 20%, such as from about 6% to about 17%, such as from about 10% to about 15%. The density of chalcogen atom vacancies is determined by XPS.

The second component includes one or more electrolytes. The one or more electrolytes can include acids, such as acids having a pKa of about 3 or less, such as from about −8 to about 3, such as from about −5 to about 2, such as from about −3 to about 1, such as from about −2 to about 0. Illustrative, but non-limiting, examples of electrolytes include sulfuric acid ($H_2SO_4$, pKa of −3), nitric acid ($HNO_3$, pKa of −1.32), phosphoric acid ($H_3PO_4$, pKa of 2.16), hydrochloric acid (HCl, pKa of −3), hydroiodic acid (HI, pKa of −8), hydrobromic acid (HBr, pKa of −8), mixtures and/or combinations thereof, in any suitable proportions. The pKa is determined by potentiometric titration.

The third component includes one or more "molecular mediator" materials. The one or more molecular mediator materials can be one or more amphiphile materials. Amphiphile materials (or amphiphile compounds) include, but are not limited to, anionic surfactants, such as carboxylic acid-based surfactants, sulfate-based surfactants, and sulfonate based surfactants. The amphiphile material/amphiphile compound can be chosen from materials whose conjugate acid has a pKa that is about −8 to about 10, such as from about −5 to about 5, such as from about −2 to about 4, such as from about −1.7 to about 3, such as from about −1 to about 1. The pKa is determined by potentiometric titration.

Illustrative, but non-limiting, examples of anionic surfactants include sodium dodecyl sulfate (SDS; $C_{12}H_{25}NaSO_4$), sodium stearate, sodium lauroyl sarcosinate, cholic acid, deoxycholic acid, glycolic acid-containing materials (e.g., glycolic acid ethoxylate 4-tert-butylphenyl ether, glycolic acid ethoxylate laurylphenyl ether, and glycolic acid ethoxylate oleyl ether), zonyl fluorosurfactant, ammonium dodecyl sulfate, dioctyl sodium sulfosuccinate, sodium dodecylbenzesulfonate, sodium lauryl sulfate, sodium lauryl ether sulfate, 3-sulfopropyl ethoxylate laurylphenyl ether, perfluorooctanesulfonic acid, perfluorobutane sulfonic acid, mixtures and/or combinations thereof, in any suitable proportions. In some aspects, the cation used with these and other anionic surfactants can be sodium, ammonium, or other suitable cations.

In some aspects, the one or more metal chalcogenides of the first component of the catalyst composition can be in the form of a monolayer film or a film including multiple layers, e.g., such as about 10 or fewer layers, such as about 5 or fewer layers. In at least one aspect, the second component is in the form of an aqueous solution and/or the third component is in the form of an aqueous solution.

In at least one aspect, the first component, the second component, third component, or combinations thereof can facilitate conversion reactions. As described above, the second component and the third component enhance the catalytic activity of metal chalcogenide by, e.g., promoting hydrogen coverage at $V_C$ sites in the metal chalcogenide.

In some aspects, the first component can have a molar ratio of Groups 3-14 metal(s) to Groups 15-16 element(s) that is from about 1:2 to about 1:1, such as from about 1:1.95 to about 1:1.5, such as from about 1:1.94 to about 1:1.8. For the first component, the molar ratio of Groups 3-14 metal(s) to Groups 15-16 element(s) is determined by XPS of the first component being analyzed.

In some aspects, the concentration of the electrolyte material (in solution) that is added to form the catalyst composition is about 0.01 molar (M) or more, such as from about 0.05 M to about 0.5 M, such as from about 0.1 M to about 0.45 M, such as from about 0.15 to about 0.4 M, such as from about 0.2 M to about 0.35 M, such as from about 0.25 to about 0.3 M.

In some aspects, the concentration of the amphiphile material (in solution) that is added to form the catalyst composition is about 0.05 millimolar (mM) or more, such as from about 0.1 mM to about 50 mM, such as from about 0.5 mM to about 45 mM, such as from about 1 mM to about 40 mM, such as from about 5 mM to about 35 mM, such as from about 10 mM to about 30 mM, such as from about 15 mM to about 25 mM.

The catalyst compositions have an amount of hydrogen atoms absorbed on the metal chalcogenide before introducing the electrolyte material and the amphiphile material, and an amount of hydrogen atoms absorbed on the metal chalcogenide after introducing the electrolyte material and the amphiphile material. The amount of hydrogen atoms absorbed is defined as the ratio between the number of hydrogen atoms absorbed at chalcogen atom vacancies and the number of chalcogen atom vacancies.

In some aspects, the amount of hydrogen atoms absorbed on the metal chalcogenide before introducing the electrolyte material and the amphiphile material is less than the amount of hydrogen atoms absorbed on the metal chalcogenide after introducing the electrolyte material and the amphiphile material. For example, prior to introducing the electrolyte material and the amphiphile material, the amount of hydrogen atoms absorbed can be less than about 50%, such as from about 10% to about 50%. After introducing the electrolyte material and the amphiphile material, the amount of hydrogen atoms absorbed can be more than about 50%, such as from about 50% to about 100%. Upon introduction of a voltage, the metal chalcogenide can have an even higher amount of hydrogen atoms absorbed. For example, the hydrogen atoms absorbed can be more than about 50%, such as from about 50% to about 100%, such as from about 100% to about 200%.

Processes for Forming Catalyst Compositions

Aspects of the present disclosure also generally relate to processes for forming catalyst compositions that are useful in, e.g., hydrogen evolution reactions. The processes enable, e.g., controlling and/or tuning the catalytic activity and/or optical and electrical properties of the metal chalcogenide in the catalyst compositions. The basal planes of metal chalcogenides are typically inefficient in various catalytic reactions. By creating enhanced concentrations of chalcogen vacancies and adsorbing hydrogen atoms onto the chalcogen atom vacancies as described herein, the activity of the metal chalcogenides can be controlled and improved.

In some aspects, a process for forming a catalyst composition includes introducing an electrolyte material and an amphiphile material to a metal chalcogenide. The metal chalcogenide has chalcogen atom vacancies. The metal chalcogenide can be in the form of a monolayer film or a film including multiple layers, e.g., such as about 10 or fewer layers, such as about 5 or fewer layers. The metal chalcogenide can be disposed on a substrate, electrode, or both. The metal chalcogenide can be formed by a variety of methods, as described below, including chemical vapor deposition.

Typically, the electrolyte material is an aqueous solution comprising one or more electrolytes and the amphiphile material is an aqueous solution comprising one or more amphiphiles (or amphiphile compounds). Here, one or more of the electrolyte materials and one or more of the amphiphile materials contact the metal chalcogenide under conditions effective to adsorb hydrogen atoms to the metal chalcogenide and/or conditions effective to dispose hydrogen atoms on one or more surfaces of the metal chalcogenide. Amounts of materials, ratios of materials, etc. that are used to form the catalyst compositions provided herein are described above.

In at least one aspect, effective conditions include a temperature from about 15° C. to about 60° C., such as from about 20° C. to about 40° C., such as from about 25° C. to about 30° C., from about 30° C. to about 35° C., or from about 35° C. to about 40° C.; and/or a time of at least about 1 minute (min), such as from about 5 min to about 6 hours (h), such as from about 10 min to about 5.5 h, such as from about 15 min to about 5 h, such as from about 30 min to about 4 h, such as from about 45 min to about 3 h, such as from about 1 h to about 2 h. In some aspects, the conditions can include stirring, mixing, and/or agitation to ensure homogeneity of the electrolyte material(s) and amphiphile material(s). In at least one aspect, the metal chalcogenide is immersed, or at least partially immersed, in the electrolyte material and the amphiphile material. The conditions can also include utilizing a non-reactive gas, such as $N_2$ and/or Ar. Any suitable pressure can be used.

In some aspects, processes for forming a catalyst composition includes electrochemically polarizing the metal chalcogenide (which may be in the form of a film) at negative potentials, by, e.g., performing cyclic voltammetry (CV) before, during, and/or after introducing one or more electrolyte materials and/or before, during, and/or after introducing one or more amphiphilic materials to the metal chalcogenide. CV cycling can be performed at an applied voltage from about −1 V versus RHE to about 0 V versus RHE, such as from about −0.8 V versus RHE to about −0.2 V versus RHE, such as from about −0.6 V versus RHE to about −0.4 V versus RHE. In some aspects, chronoamperometry can be performed before, during, and/or after introducing one or more electrolyte materials and/or one or more amphiphilic materials to the metal chalcogenide. Chronoamperometry can be performed at an applied voltage from about −0.8 V versus RHE to about −0.4 V versus RHE, such as from about −0.7 V versus RHE to about −0.5 V versus RHE. Such operations can aid in the adsorption of hydrogen atoms to the metal chalcogenide.

In some aspects, processes for forming a catalyst composition can include providing a metal chalcogenide (which can be in the form of a film) and/or disposing/adsorbing hydrogen atoms on one or more surfaces of the metal chalcogenide. The metal chalcogenide film can be disposed on a substrate (such as a Si-containing substrate), one or more electrodes, or both. The electrode can be made of, or include, any suitable material such as graphene, glassy carbon, copper, nickel, silver, and titanium.

Processes for changing one or more properties of a metal chalcogenide are also described. Such properties include catalytic activity, hydrogen atom adsorption, photoluminescence, and electrical properties. The processes for changing one or more properties of a metal chalcogenide can include introducing/adding hydrogen atoms to a metal chalcogenide (which can be in the form of a film), or to a surface thereof. In some aspects, adding introducing/adding hydrogen atoms includes electrochemically polarizing the metal chalcogenide film at negative potentials, by, e.g., performing cyclic voltammetry (CV) before, during, and/or after introducing one or more electrolyte materials and/or before, during, and/or after introducing one or more amphiphilic materials to the metal chalcogenide. CV cycling can be performed at an applied voltage from about −1 V versus RHE to about 0 V versus RHE, such as from about −0.8 V versus RHE to about −0.2 V versus RHE, such as from about −0.6 V versus RHE to about −0.4 V versus RHE. In some aspects, chronoamperometry can be performed before, during, and/or after introducing one or more electrolyte materials and/or one or more amphiphilic materials to the metal chalcogenide. Chronoamperometry can be performed at an applied voltage from about −0.8 V versus RHE to about −0.4 V versus RHE, such as from about −0.7 V versus RHE to about −0.5 V versus RHE.

Processes for Forming Metal Chalcogenides

A variety of processes can be used to form the metal chalcogenides. An example process is disclosed in U.S. patent application Ser. No. 16/217,845, now U.S. Pat. No. 10,832,906, which is incorporated by referenced herein in its entirety. The process of forming a metal chalcogenide can include depositing a salt on a substrate, wherein the substrate is covered by a mask having a patterned shape, to form a pre-deposited patterned salt on the substrate; and thermally co-depositing a metal oxide and a chalcogen onto the pre-deposited patterned salt to form a patterned monolayer. It should be understood, however, that according to some aspects, the salt as described herein can be deposited without a pattern. For example, according to some aspects, the processes can be performed without a mask, therefore providing salt over a complete surface of the substrate. In this way, separated single-crystals or a continuous film of metal chalcogenide material can be provided over about the entire surface of the substrate.

According to some aspects, the processes for forming the metal chalcogenide relate to direct growth of a patterned metal chalcogenide monolayer comprising depositing a salt on a substrate, wherein the substrate is covered by a mask having a patterned shape, to form a pre-deposited patterned salt on the substrate; and thermally co-depositing a metal oxide and a chalcogen onto the pre-deposited patterned salt on the substrate to form a patterned metal chalcogenide monolayer on the pre-deposited patterned salt. The present disclosure is also directed to a process of making a metal chalcogenide monolayer comprising providing a substrate, depositing a salt on the substrate, and depositing a metal oxide and a chalcogen onto the deposited salt to form the metal chalcogenide monolayer.

It should be understood that while the processes for direct growth of a patterned $MoS_2$ monolayer using molybdenum dioxide ($MoO_2$) as the metal oxide and sulfur (S) as the chalcogen, various patterned monolayers can be prepared according to the process described herein. For example, according to some aspects, the monolayer can include tungsten disulfide ($WS_2$) and/or molybdenum diselenide ($MoSe_2$) by using tungsten dioxide ($WO_2$) and/or tungsten trioxide ($WO_3$) as a metal oxide as described herein and/or by using selenium (Se) as a chalcogen as described herein. Moreover, while processes for forming metal dichalcogenides are described, processes for forming metal monochalcogenides, metal trichalcogenides, and metal tetra-chalcogenides are contemplated. In addition, while the processes relate to forming monolayers of the metal chalcogenide, the processes described herein can be used to multilayer structures/films of metal chalcogenides.

In some aspects, salts useful for forming the metal chalcogenide include, but are not limited to, sodium salts and potassium salts, such as NaBr, NaCl, KBr, KCl, and combinations thereof. It should be understood that while NaBr is used herein as an exemplary salt, any suitable salt can be used in addition to or instead of the same. As used herein, the term "salt" refers to an electrically neutral ionic compound having cation(s) and anion(s). According to some aspects, the salt can be capable of, at least in part, providing a monolayer single crystal having large-sized (e.g., from about 20 μm to 200 μm) domains and/or reducing strain of growing monolayer films by passivating the edges of the domains. Without wishing to be bound by theory, large-sized domains can be achieved, at least in part, by the salt assisting in nucleation and/or altering the mode of the film growth, in particular, from Volmer-Weber (VW, i.e., the island growth) or Stranski-Krastanov (SK, i.e., layer-plus-island) to Frankvan der Merwe (FM, i.e., the layer-by-layer growth). According to some aspects, the transition from VW or SK to FM can be attributed, at least in part, to alterations of the substrate surface (e.g., surface tension and/or wettability) and/or interfacial energies provided by the cation(s) of the salt.

According to some aspects, the substrate can be a nonreactive material suitable for use according to the processes described herein. Examples of substrates useful according to the present disclosure include, but are not limited to, substrates comprising or consisting of $SiO_2$, Si, c-sapphire, fluorophlogopite mica, $SrTiO_3$, hexagonal boron nitride (h-BN), or combinations thereof. It should be understood that while a $SiO_2$ substrate is used herein as an exemplary substrate, any suitable substrate can be used in addition to or instead of the same.

Figure 2A:
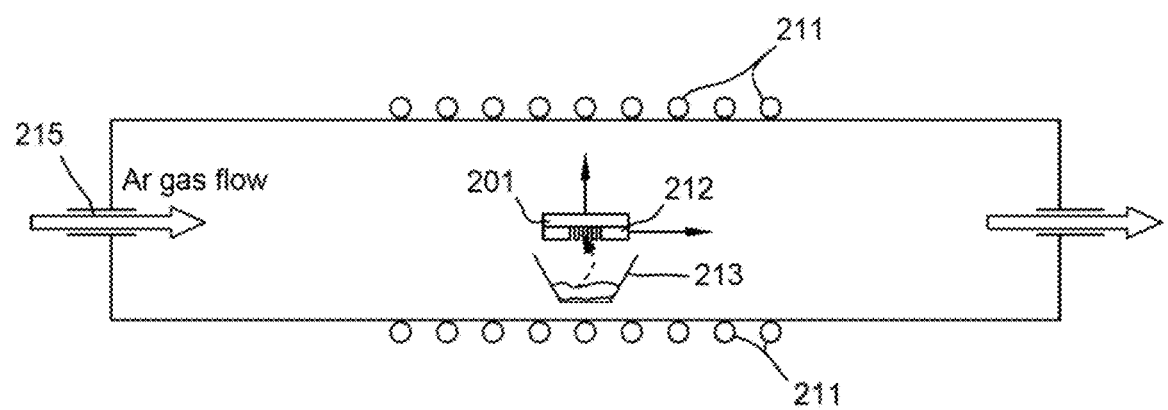
FIG. 2A shows an example scheme for thermally depositing a patterned salt layer on a heated substrate through a mask according to at least one aspect of the present disclosure.

As shown in FIG. 2A, the process for forming a metal chalcogenide includes providing a substrate 201, for example, a $Si/SiO_2$ substrate, with a mask 202 having a patterned shape. As used herein, the term "mask" refers to any device suitable for providing a patterned shape as described here. According to some aspects, the mask can include a thin material that has dimensions that correspond to approximately the dimensions of the substrate and includes a patterned shape. According to some aspects, the mask can have a thickness of about 0.01 mm to about 0.5 mm, such as from about 0.01 mm to about 0.4 mm, such as about 0.2 mm or about 0.3 mm. According to some aspects, the mask can include a metal alloy, such as stainless steel. According to some aspects, the patterned shape can be defined by a single or an array of shaped voids in the mask. The void(s) can be of any shape and can be suitably sized (e.g., from about 100 nm to about 1 cm) to define an area smaller than the surface area of the face of the substrate over which the mask is provided. According to some aspects, the patterned shape can be defined by a 20×20 array of shaped voids, a 15×15 array, a 10×10 array, or a 5×5 array. According to some aspects, the voids can be substantially round and can have a diameter of from about 1 μm to about 600 μm, such as from about 100 μm to about 500 μm, such as from about 200 μm to about 400 μm, such as about 300 μm.

According to some aspects, the $Si/SiO_2$ substrate 201 covered by the mask 202 can be provided over a first tray 203 containing a salt, for example, NaBr, such that the face of the substrate 201 covered by the mask 202 contacts the salt (alternatively described herein as a "face down" position). The first tray 203 can be of any shape and size. The term "tray" is not particularly limited, and suitable trays include but are not limited to, weigh boats, crucibles, flasks, or other vessels that can withstand the temperature excursions of the processes disclosed herein. The masked $Si/SiO_2$ substrate 201 can be suitably provided face down over the first tray of NaBr such that at least a portion of the shaped void in the mask covers at least a portion of the NaBr in the first tray.

The first tray 203 covered with the $Si/SiO_2$ substrate 201 covered with the mask 202 can be heated such that NaBr is deposited onto the $Si/SiO_2$ substrate 201, that is, such that NaBr is thermally deposited onto the $Si/SiO_2$ substrate 201. According to some aspects, heating can be performed with a heating mechanism, for example, with one or more heating wires 211 above and/or below the first tray 203, such as in an oven or other suitable apparatus as can be known in the art. According to some aspects, the heating apparatus can include a quartz tube. According to some aspects, the heating apparatus can be provided with a non-reactive gas flow, such as an argon (Ar) gas flow 215.

As shown in FIG. 2A, the first tray 203 covered with the $Si/SiO_2$ substrate 201 covered with the mask 202 can be heated to a first temperature for a first time period suitable to provide thermal deposition of the NaBr onto the $Si/SiO_2$ substrate 201 in the area exposed by the shaped void in the mask 202 to form a pre-deposited pattern of NaBr salt on the $Si/SiO_2$ substrate 201.

According to some aspects, the first temperature can be from about 600° C. to about 900° C., such as from about 650° C. to about 850° C., such as from about 700° C. to about 800° C., such as from about 740° C. to about 800° C., such as about 750° C. or about 770° C. According to at least one aspect, the first temperature can be achieved by ramping the temperature, for example, by ramping the temperature from room temperature to the first temperature. For example, according to some aspects, the first temperature can be achieved by ramping the temperature from room temperature to the first temperature at a rate from about 10° C./minute to about 70° C./minute, such as about 40° C./minute. As used herein, the term "room temperature" refers to a temperature from about 15 to about 25° C. According to some aspects, the first time period can be from about 1 minute to about 1 hour, such as from about 1 to about 30 minutes, such as from about 1 to about 15 minutes, such as from about 3 and 15 minutes.

Figure 2B:
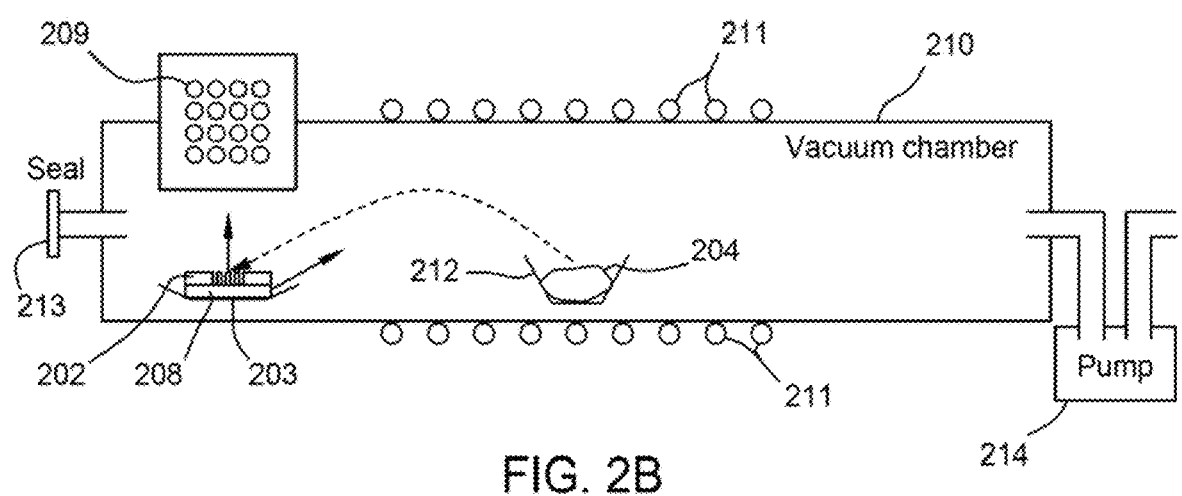
FIG. 2B shows an example scheme for thermally depositing salt on a cool substrate in a vacuum chamber according to at least one aspect of the present disclosure.

FIG. 2B shows another example of depositing a salt on a substrate according to aspects of the present disclosure. As shown in FIG. 2B, the process can include providing a cool substrate 208, for example, a Si/SiO$_2$ substrate, with a mask 202 having a patterned shape. As used herein, the term "cool" refers to a temperature of no more than about 100° C., such as no more than about 50° C., such as no more than about 25° C. According to some aspects, the patterned shape can be defined by a single or an array of shaped voids 209 in the mask, for example, as described herein in relation to FIG. 2A.

According to some aspects, the Si/SiO$_2$ substrate 208 covered by the mask 202 can be provided over a first tray 203. The first tray 203 can be of any shape and size as described herein in relation to FIG. 2A. The masked Si/SiO$_2$ substrate 208 can be suitably provided such that the face of the substrate 208 covered by the mask 202 is opposite the first tray 203 (alternatively described herein as a "face up" position).

Similar to the example shown in FIG. 2B, the Si/SiO$_2$ substrate 208 covered by the mask 202 can be provided in a heating apparatus 210 having, for example, one or more heating wires 211, such as an oven or other suitable apparatus as can be known in the art. However, unlike the example shown in FIG. 2A, the first tray 203 having the Si/SiO$_2$ substrate 208 covered by the mask 202 thereon can be provided in the heating apparatus 210 away from the one or more heating wires 211 such that the substrate 208 can maintain a cool temperature.

As shown in FIG. 2B, the process can include providing a salt tray 212 containing a salt 204 as described herein in a region of the heating apparatus 210 capable of heating the salt tray 212 to a deposition temperature of from about 100° C. to about 1100° C., such as from about 200° C. to about 1000° C., such as from about 300° C. to about 900° C., such as from about 400° C. to about 800° C., such as from about 500° C. to 700° C., such as about 600° C. For example, the process can include providing the salt tray 212 in a region of the heating apparatus 210 that is within heating proximity of the one or more heating wires 211. The salt tray 212 can be similar in some aspects to the first tray as described herein. The process can include evacuating the heating apparatus 210, sealed with a seal 213, to a reduced pressure, for example, by means of a mechanical pump 214. The reduced pressure can be no more than about 200 mTorr, such as no more than about 100 mTorr, such as no more than about 50 mTorr, such as no more than about 10 mTorr, such as no more than about 1 mTorr. The process can further include heating the salt tray 212 containing the salt 204 under the reduced pressure to the deposition temperature for a time period suitable to provide deposition of the salt 204 onto the substrate 208 in the area exposed by the shaped void in the mask 202 to form a pre-deposited pattern of salt 204 on the substrate 208, as described herein.

Figure 2C:
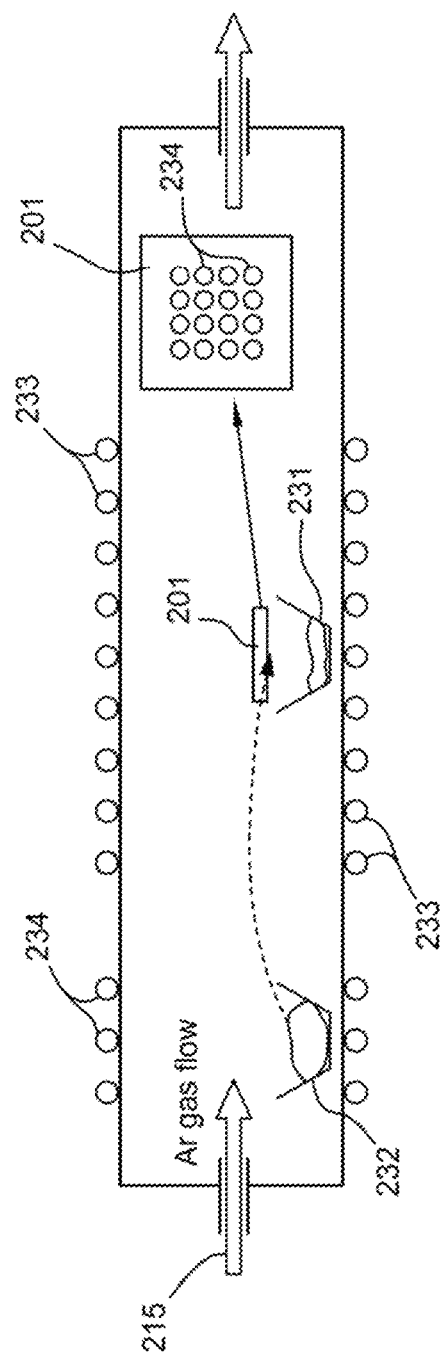
FIG. 2C shows an example scheme for depositing a patterned metal chalcogenide monolayer on a substrate according to at least one aspect of the present disclosure.

As shown in FIG. 2C, the Si/SiO$_2$ substrate 201 with the pre-deposited patterned NaBr salt 234 prepared, for example, as shown in FIG. 2A or FIG. 2B, can then be provided over a metal oxide tray 231 containing metal oxide powder, such as MoO$_2$ powder, with the face bearing the pre-deposited patterned NaBr salt 234 face down, that is, in contact with the MoO$_2$ powder. The metal oxide tray 231 covered with the pre-deposited patterned NaBr salt 234 on the Si/SiO$_2$ substrate 201 can be heated to a metal oxide temperature by a heating mechanism 233 under a gas flow of the mixture of non-reactive gas and hydrogen gas. For example, as shown in FIG. 2C, the metal oxide tray 231 covered with the pre-deposited patterned NaBr salt 234 on the Si/SiO$_2$ substrate 201 can be provided between heating wires in a heating apparatus, such as a quartz tube. The metal oxide tray can be similar in some or all aspects to the first tray. According to at least one aspect, the metal oxide temperature can be from about 600° C. to about 900° C., such as from about 650° C. to about 850° C., such as from about 700° C. to about 800° C., such as from about 740° C. to about 800° C., such as about 750° C. or about 770° C.

According to some aspects, the growth of MoS$_2$ using MoO$_2$ and S on the substrate with pre-deposited, patterned NaBr involves the use of hydrogen (H$_2$) gas together with a non-reactive gas as the carrier gas. The non-reactive gas can be Ar or N$_2$, such as Ar. The mixture of Ar and H$_2$ gas with different H$_2$ concentrations controls the concentration of V$_S$ of the resulting MoS$_2$. The H$_2$ concentration is determined by the (flow rate of H$_2$)/(total flow rate of Ar and H$_2$). The total flow rate of Ar and H$_2$ can be from about 40 standard cubic centimeters per minute (sccm) to about 200 sccm, such as from about 60 sccm to about 100 sccm, such as from about 60 sccm to about 80 sccm. The H$_2$ concentration can be from about 0% to about 20%, such as from about 1% to about 10%, such as from about 2% to about 5%.

According to some aspects, a chalcogen tray 232, which can be similar in some or all aspects to the first and/or metal oxide trays, can also be provided. The chalcogen tray 232 can contain chalcogen powder, such as S powder. According to some aspects, the chalcogen tray 232 can be provided in the heating apparatus upstream of the metal oxide tray 231 relative to the (Ar+H$_2$) gas flow 215. The chalcogen tray 232 can be heated to a chalcogen temperature by a heating mechanism 233 that is the same or different from the heating mechanism 233 used to heat the metal oxide tray 231. For example, the chalcogen tray can be heated to the chalcogen temperature by providing the chalcogen tray between heating belts and/or heating wires.

The chalcogen temperature can be the same or different from the first temperature and/or the metal oxide temperature. For example, according to some aspects, the chalcogen temperature can be from about 50° C. to about 350° C., such as from 100° C. to about 300° C., such as from about 150° C. to about 250° C., such as about 200° C. Alternatively, and according to some aspects, the chalcogen temperature can be from about 250° C. to about 650° C., such as from about 300° C. to about 600° C., such as from about 350° C. to about 550° C., such as about 450° C.

According to some aspects, the metal oxide temperature and the chalcogen temperature can be selected such that MoO$_2$ and S are co-deposited onto the pre-deposited patterned NaBr salt 234 on the Si/SiO$_2$ substrate 201 to form a patterned MoS$_2$ monolayer on the pre-deposited patterned NaBr salt 234 on the Si/SiO$_2$ substrate 201.

According to some aspects, the heating apparatus can include a quartz tube. According to some aspects, the heating apparatus can be provided with a non-reactive gas flow, such as an argon (Ar) gas flow. According to some aspects, the heating apparatus can be provided with a non-reactive gas flow and a hydrogen (H$_2$) gas flow, such as an argon Ar+H$_2$ gas flow.

It should be understood that the $MoS_2$ crystals of the monolayer described herein can be grown in various shapes and sizes, depending on the shape and size of the pre-deposited patterned NaBr salt. According to some aspects, the size and/or shape of the resulting $MoS_2$ crystals can also depend on one or more of: the NaBr concentration deposited on the substrate, the weight ratio of starting material (e.g., the weight ratio of $(MoO_2+NaBr):S$, $MoO_2:NaBr$, and/or $MoO_2:S$), the $Ar+H_2$ gas flow rate, and/or the processing times.

Methods of Using Catalyst Compositions

The present disclosure also relates to methods of using the catalyst compositions described herein. For example, the catalyst compositions can be used for various reactions such as hydrogen evolution reactions, e.g., hydrogen evolution from water. As described above, the properties of the catalyst compositions made by processes described herein are improved over those compositions made by conventional methods. For example, the catalyst compositions described herein exhibit improved catalytic activity due to, e.g., increased amounts of H-atoms adsorbed on the metal chalcogenide.

In some examples, a method of using the catalyst composition can include introducing the catalyst compositions to a reactant to form a product. For example, a process for converting water to conversion product(s) can include introducing an aqueous electrolyte material and an aqueous amphiphile material to a metal chalcogenide, and obtaining conversion products, e.g., hydrogen. The process can further include introducing a voltage before, during, and/or after introducing one or more electrolyte materials and/or before, during, and/or after introducing one or more amphiphilic materials to the metal chalcogenide. Applied voltages can be from about −1 V versus RHE to about 0 V versus RHE, such as from about −0.8 V versus RHE to about −0.2 V versus RHE, such as from about −0.6 V versus RHE to about −0.4 V versus RHE. In some aspects, chronoamperometry can be performed before, during, and/or after introducing one or more electrolyte materials and/or one or more amphiphilic materials to the metal chalcogenide. Chronoamperometry can be performed at an applied voltage from about −0.8 V versus RHE to about −0.4 V versus RHE, such as from about −0.7 V versus RHE to about −0.5 V versus RHE.

Accordingly, and in some aspects, the catalyst compositions can be used in such applications and/or can be incorporated into desired devices (e.g., reactors) useful for such applications.

In some aspects, the hydrogen evolution reaction can be performed in a device. For example, the device can be a multilayer structure contacting an electrolyte material and an amphiphile material. Here, the multilayer structure can be, e.g., immersed in the electrolyte material and/or amphiphile material. The multilayer structure can include a substrate (such as a Si-containing substrate, such as $SiO_2$. A source electrode and a drain electrode can be disposed over at least a portion of the substrate, and a metal chalcogenide as described herein can be disposed on at least a portion of the source electrode and at least a portion of the drain electrode.

The following examples are put forth so as to provide those of ordinary skill in the art with a complete disclosure and description of how to make and use aspects of the present disclosure, and are not intended to limit the scope of aspects of the present disclosure. Efforts have been made to ensure accuracy with respect to numbers used (e.g. amounts, dimensions, etc.) but some experimental errors and deviations should be accounted for.

EXAMPLES

Optical microscope images were captured using a Renishaw InVia™ micro-Raman system equipped with an optical microscope. X-ray photoelectron spectroscopy (XPS) was performed using a PHI VersaProbe™ III scanning XPS microprobe (Physical Electronics) with an aluminum x-ray anode and a micro-focused scanning x-ray source. The typical beam size was ~20 μm (power: ~5 W). Cyclic voltammetry was performed using a BioLogic SP-300 Bi-potentiostat, with a potential window from +0.7 V to −1 V vs RHE with a scan rate of 20 mV/s. Photoluminescence data was collected using a Renishaw InVia™ Micro-Raman system, with a monochromatic excitation laser wavelength of 532 nm.

Example 1

Synthesis of Monolayer $MoS_2$

Monolayer (ML) $MoS_2$ was synthesized by atmospheric pressure chemical vapor deposition (CVD). Ultrahigh purity hydrogen ($H_2$) flow was introduced to control the $V_S$ concentration in the CVD-grown ML $MoS_2$. Specifically, $Si/SiO_2$ substrates were placed face-down above an alumina crucible containing ~2 mg powder of $MoO_2$ mixed with NaBr at certain ratios as the precursor. The crucible with $MoO_2$ and substrates was loaded at the center of the quartz tube. Another crucible containing ~50 mg sulfur powder was located at the upstream side of the tube, where a heating belt was wrapped. After flushing the tube with ~500 standard cubic centimeter per minute (sccm) ultrahigh purity argon (Ar) gas, the precursor was heated to ~770° C. (with a ramping rate of 40° C./min) and the sulfur was heated to ~200° C. by the heating belt under a mixture of Ar and $H_2$ gas flow at a total of about 80 sccm, at which the reaction was kept for about 5 minutes. After growth, the heating belt was removed and the furnace was opened to allow rapid cooling down to room temperature with a fan. Adjusting the $Ar/H_2$ ratio allows tuning of $V_S$ concentration in the as-grown ML $MoS_2$. For example, without $H_2$, ML $MoS_2$ shows a typical $V_S$ concentration of ~6%; while with 3.75% and 5% of $H_2$, the typical $V_S$ concentration increases to ~10% and ~17%, respectively. The $V_S$ concentration was determined using XPS measurements shown in FIG. 3.

Figure 3:
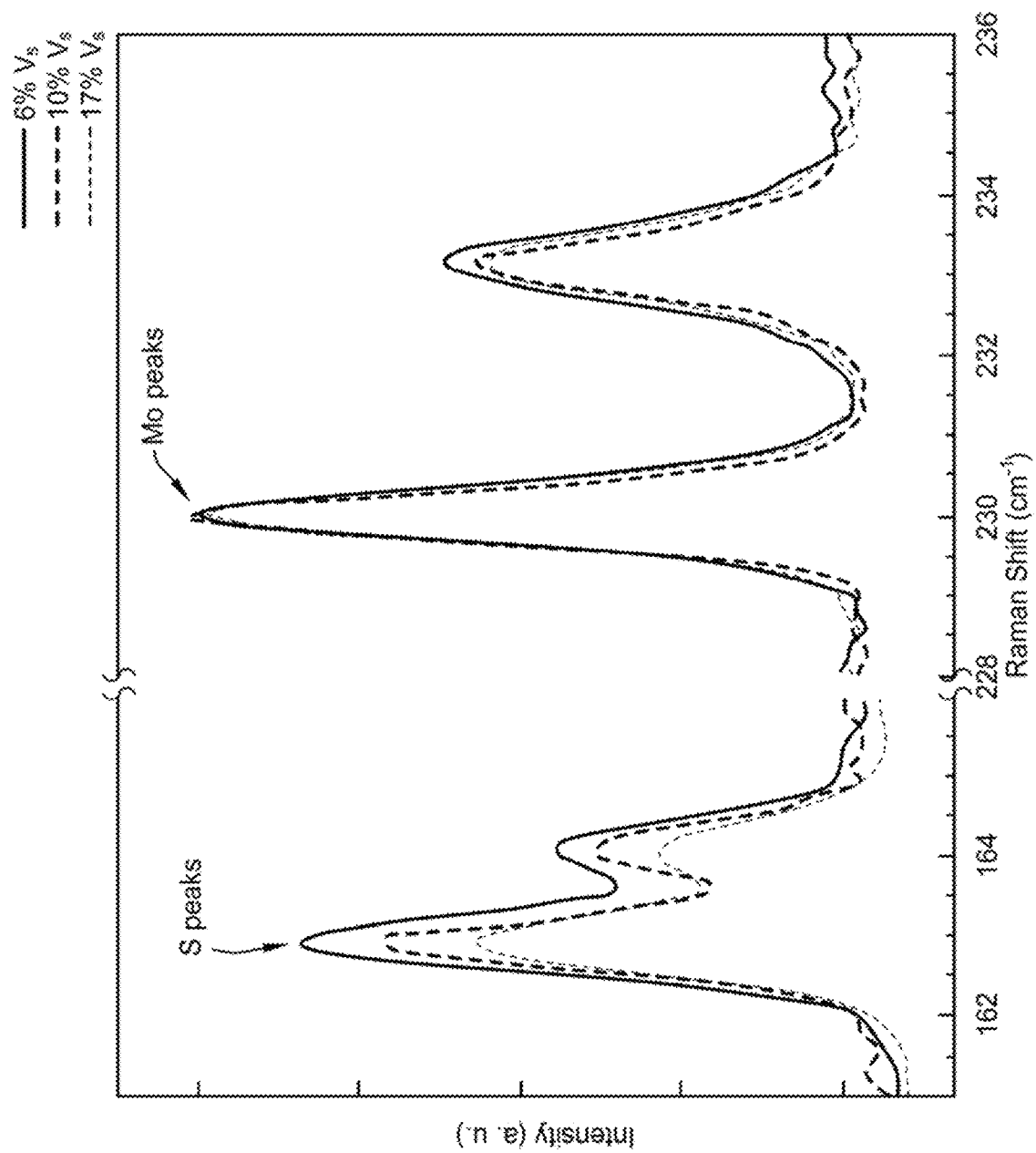
FIG. 3 shows exemplary high-resolution x-ray photoelectron spectroscopy (XPS) Mo (3d) and S (2p) scan data from the basal planes of individual ML $MoS_2$ flakes with $V_S$ concentrations of 6%, 10%, and 17% according to at least one aspect of the present disclosure.

FIG. 3 shows XPS spectra of three example ML $MoS_2$ flakes with differing concentrations of catalytically active sites (e.g., $V_S$ in the basal plane): 6% $V_S$, 10% $V_S$, and 17% $V_S$. Here, the intensity of the characteristic S peaks indicates the amount of $V_S$ for the examples. To obtain differing $V_S$ concentrations, the ratio of $H_2$ flow to Ar flow was adjusted. The XPS spectra were acquired from the individual flakes with a beam size of ~20 μm, and were normalized according to the Mo ($3d_{5/2}$) peak.

The peaks at ~163 eV, ~164 eV, ~230 eV, and ~233 eV are indicative of S ($2p_{3/2}$), S ($2p_{1/2}$), Mo ($3d_{5/2}$), and Mo ($3d_{3/2}$), respectively. From the ratio between the area of the S peaks and the area of the Mo peaks, the value of x in $MoS_{2-x}$ can be obtained. The average value of x in $MoS_{2-x}$ based on different flakes measured within each sample is 0.12 (~0% $H_2$), 0.21 (~3.75% $H_2$), and 0.34 (~5% $H_2$), corresponding to 6%, 10%, and 17% of S vacancy, respectively.

Example 2

Example Device for Measuring HER Performance

Figure 4:
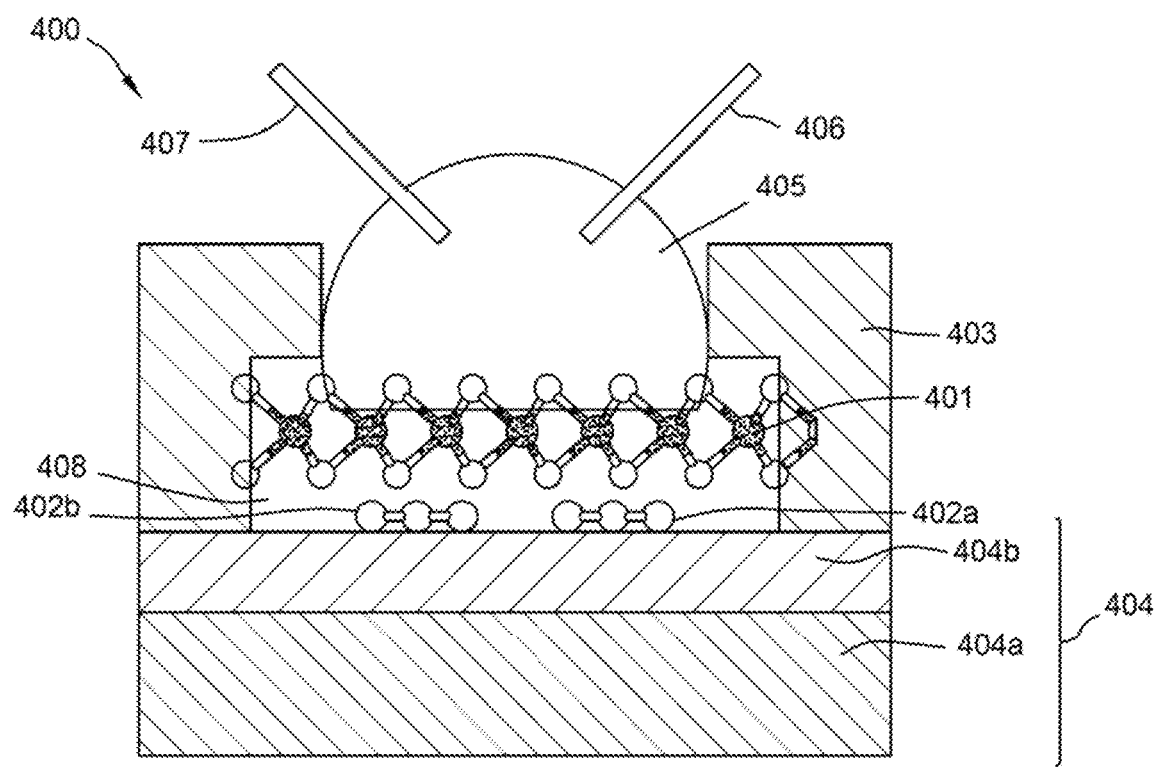
FIG. 4 is a side view of an example device for testing the hydrogen evolution reaction performance of an example catalyst composition according to at least one aspect of the present disclosure.

FIG. 4 is an illustration of a side view of an example device 400 for testing the hydrogen evolution reaction performance of a metal chalcogenide with an electrolyte material and a molecular mediator material. The device is utilized to show that only the basal plane of the metal chalcogenide contributes to the hydrogen evolution reaction. The materials utilized for the device set-up are non-limiting. The device includes a substrate 404 made of two layers—a first layer 404a (e.g., a highly-doped Si layer) and a second layer 404b made of a dielectric material (e.g., thermally oxidized $SiO_2$, having a thickness of about 285 nm). A third layer 403 formed of, e.g., poly(methyl methacrylate) (PMMA), is disposed above the second layer 404b. A channel 408 (or opening) is formed within the third layer 403. A source electrode 402a and a drain electrode 402b are disposed above the second layer 404b within the channel 408. The source electrode 402a and the drain electrode 402b can be made of graphene. As discussed below, the current measured between the source electrode 402a and the drain electrode 402b is referred to as the source-drain current ($I_{SD}$).

For the experiments, a metal chalcogenide 401 (e.g., a ML $MoS_2$ flake) is transferred onto the substrate 404 and electrodes 402a, 402b. The third layer 403 (e.g., PMMA) is used to cover the edge areas of the ML $MoS_2$ flake to ensure that only the basal plane of ML $MoS_2$ contributes to the HER. A counter electrode 406 and a reference electrode 407 are used to measure the electrochemical HER current ($I_{EC}$) in the electrolyte material/molecular mediator material 405 (e.g., an aqueous solution of about 0.05 M to about 0.5 M $H_2SO_4$ and about 0.1 mM to about 50 mM SDS). The electrolyte material and the molecular mediator material are added by using a pipette.

Figure 5:
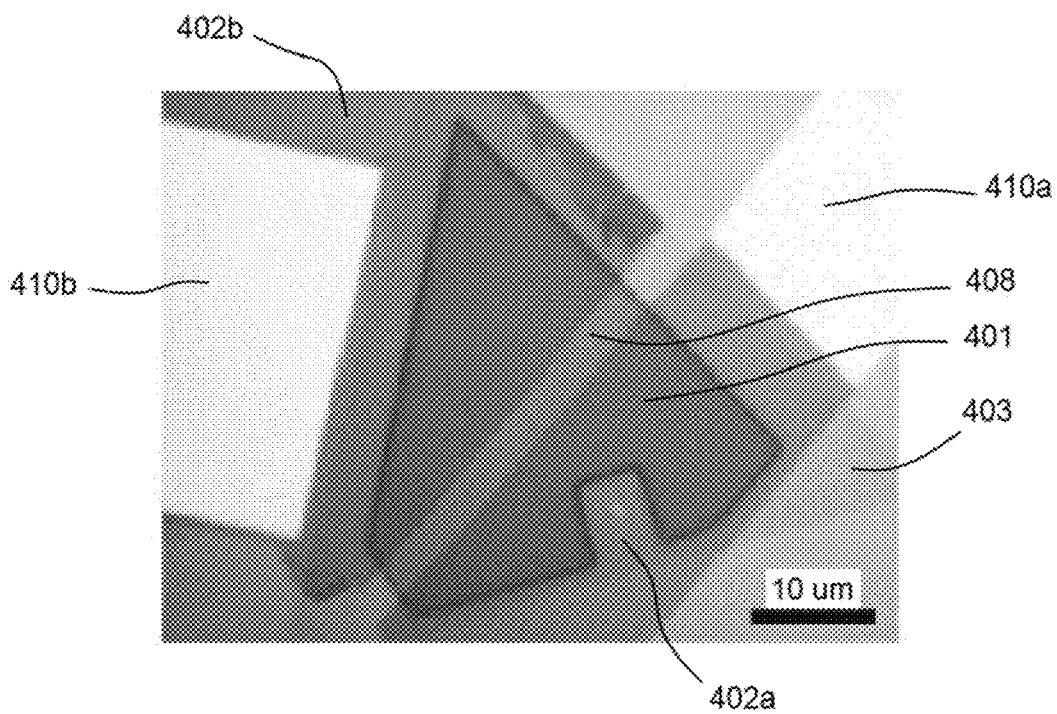
FIG. 5 is an exemplary optical microscope image of a top view of an example device for testing HER performance according to at least one aspect of the present disclosure (Scale: 10 μm).

FIG. 5 is an exemplary optical microscope image of a top view of the device for testing HER performance (Scale: 10 μm). The ML $MoS_2$ flake 401 is on top of two pieces of exfoliated graphene as the source electrode 402a and the drain electrode 402b that are connected with Au electrodes 410a and 410b for measuring $I_{SD}$. The area except for the $MoS_2$ basal plane is covered by a ~1.2 μm thick PMMA layer 403, to ensure that the basal plane alone contributes to the HER activity. This platform is used as the working electrode (WE) in 0.5 M $H_2SO_4$ for HER testing with a reference electrode (407) and a counter electrode (CE, 406), as schematically illustrated in FIG. 4. The ML $MoS_2$ is self-gated during HER measurement, and the two graphene contacts work as the source electrode and drain electrodes.

Example 3

HER Performance of Example Monolayer $MoS_2$

FIGS. 6A and 6B show the catalytic performance of ML $MoS_2$ flakes with different $V_S$ concentrations in electrolytes without SDS (aqueous solution of $H_2SO_4$) and with SDS (SDS/$H_2SO_4$). HER performance of Pt (platinum) is used as the comparative as it is a standard catalyst for HER. Specifically, FIG. 6A shows the electrochemical HER current ($I_{EC}$) as a function of potential versus RHE. The onset potential is defined as the potential vs RHE at which the $I_{EC}$ reaches −5 mA cm$^{-2}$. The onset potential of ML $MoS_2$ with ~6%, ~10%, and ~17% $V_S$ in $H_2SO_4$ electrolyte (without SDS) is about −0.87 V, about −0.45 V, and about −0.33 V, respectively, while those in $H_2SO_4$ electrolyte (with SDS) are promoted to about −0.16 V, about −0.14 V, and about −0.12 V, respectively, approaching the level of the comparative platinum Pt example (about −0.02 V). That is, compared to electrolyte alone, the use of SDS with electrolyte can improve the HER onset potential of $MoS_2$ by about 6 times. FIG. 6B shows the turnover frequency (TOF) of ML $MoS_2$ flakes with 6%, 10%, and 17% $V_S$ in $H_2SO_4$ electrolyte (without SDS) and $H_2SO_4$ electrolyte (with SDS). The TOF value is improved up to about 0.2 s$^{-1}$ with SDS, which is at the same level of the comparative Pt (about 0.1 s$^{-1}$ to about 1 s$^{-1}$, not shown).

Figure 7A:
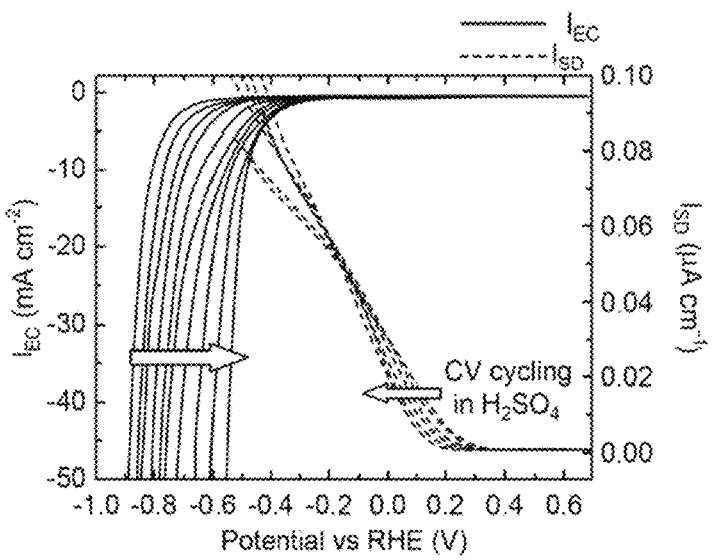
FIG. 7A shows exemplary cyclic voltammetry data of an example ML MoS$_2$ in H$_2$SO$_4$ electrolyte without sodium dodecyl sulfate (SDS) according to at least one aspect of the present disclosure.
Figure 7B:
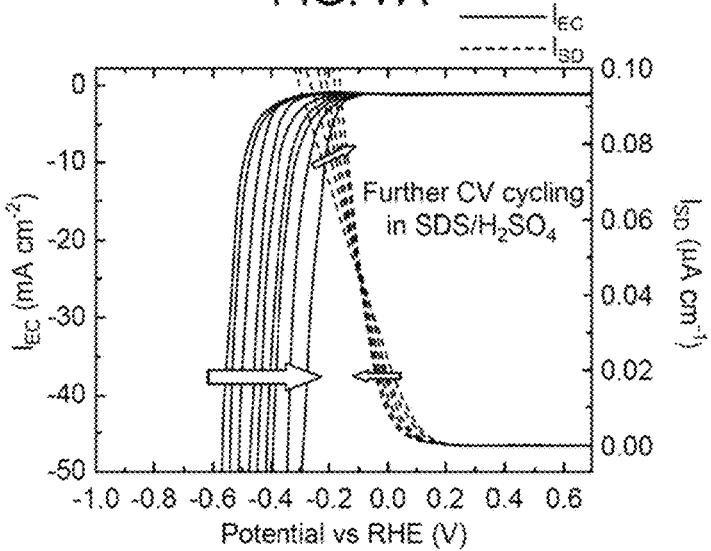
FIG. 7B shows exemplary cyclic voltammetry data of an example ML MoS$_2$ in H$_2$SO$_4$ electrolyte with SDS according to at least one aspect of the present disclosure.

FIGS. 7A and 7B show exemplary cyclic voltammetry data of a ML $MoS_2$ in $H_2SO_4$ electrolyte without SDS and with SDS, respectively. Specifically, FIG. 7A shows the HER current (electrochemical current, $I_{EC}$) and source-drain current ($I_{SD}$) plotted as a function of applied potential vs RHE recorded simultaneously during cyclic voltammograms (CV) of the $MoS_2$/graphene device in 0.5 M $H_2SO_4$ electrolyte. The results show that when utilizing the $H_2SO_4$ electrolyte without SDS, $I_{EC}$ improves as the onset of the $I_{SD}$ current shifts simultaneously to smaller values of potential versus RHE, indicating increased hydrogen coverage at $V_S$. FIG. 7B shows $I_{EC}$ and $I_{SD}$ as a function of applied potential vs RHE recorded simultaneously during further CV of the $MoS_2$/graphene device in SDS/$H_2SO_4$. This CV cycling (of FIG. 7B) is performed after the 50 cycles in 0.5 M $H_2SO_4$ electrolyte. Here, the HER current ($I_{EC}$) further improves as the onset of the $I_{SD}$ current further shifts simultaneously to smaller values of potential versus RHE, indicating that the addition of SDS to the electrolyte further increases the hydrogen-coverage at $V_S$.

Figure 7C:
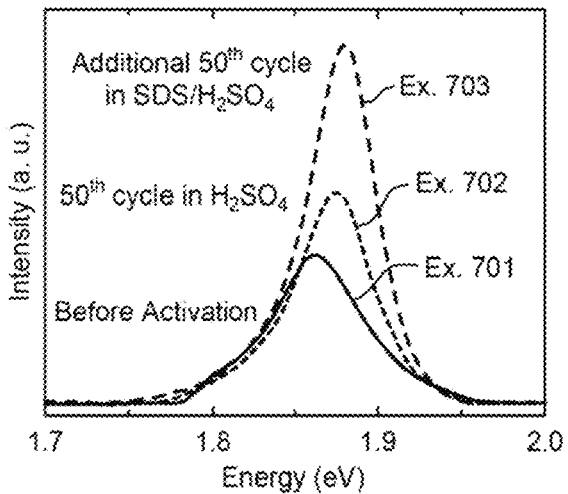
FIG. 7C shows exemplary photoluminescence data of an example ML MoS$_2$ without electrolyte and without SDS, an example ML MoS$_2$ in H$_2$SO$_4$ electrolyte without SDS (50th cycle), and an example ML MoS$_2$ in H$_2$SO$_4$ electrolyte with SDS (100th cycle) according to at least one aspect of the present disclosure.
Figure 8B:
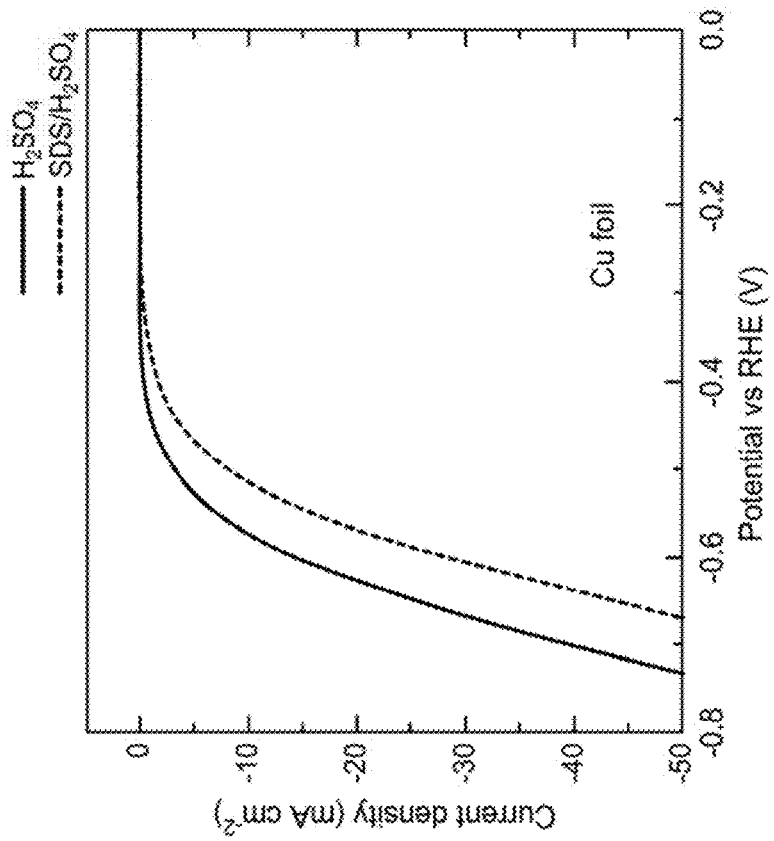
FIG. 8B shows exemplary data of I$_{EC}$ as a function of applied potential vs RHE for an example ML MoS$_2$, in H$_2$SO$_4$ electrolyte with SDS and without SDS, contacting copper-foil source and drain electrodes according to at least one aspect of the present disclosure.
Figure 8A:
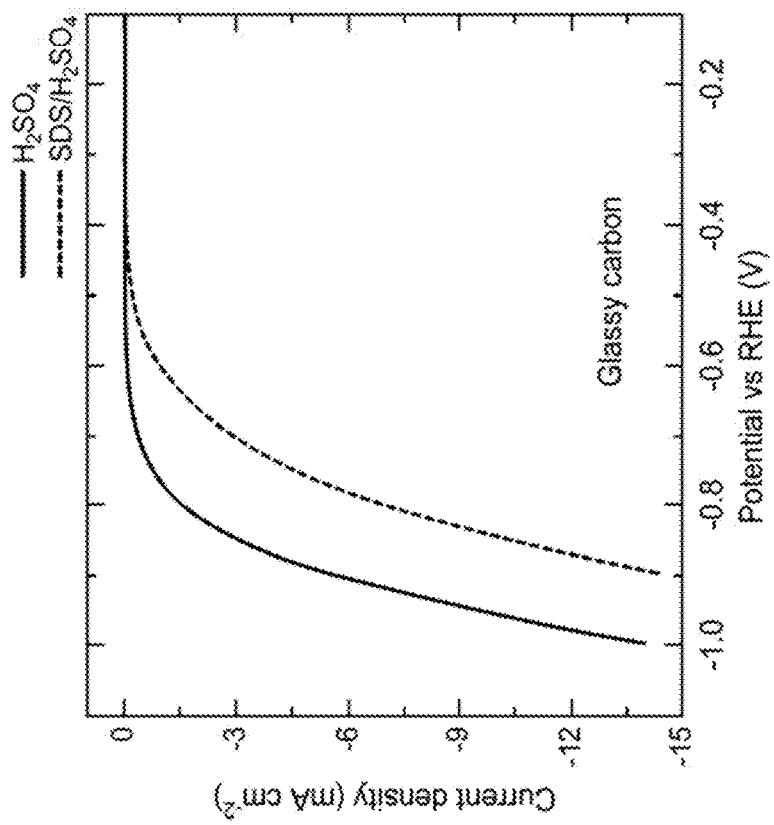
FIG. 8A shows exemplary data of I$_{EC}$ as a function of applied potential vs RHE for an example ML MoS$_2$, in H$_2$SO$_4$ electrolyte with SDS and without SDS, contacting glassy-carbon source and drain electrodes according to at least one aspect of the present disclosure.
Figure 8D:
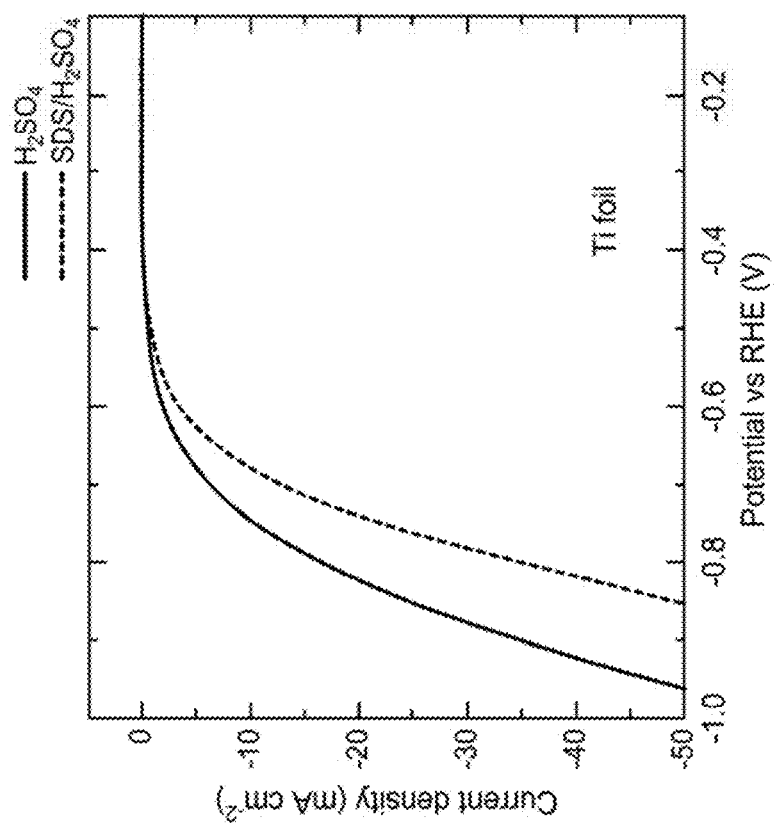
FIG. 8D shows exemplary data of I$_{EC}$ as a function of applied potential vs RHE for an example ML MoS$_2$, in H$_2$SO$_4$ electrolyte with SDS and without SDS, contacting titanium-foil source and drain electrodes according to at least one aspect of the present disclosure.
Figure 8C:
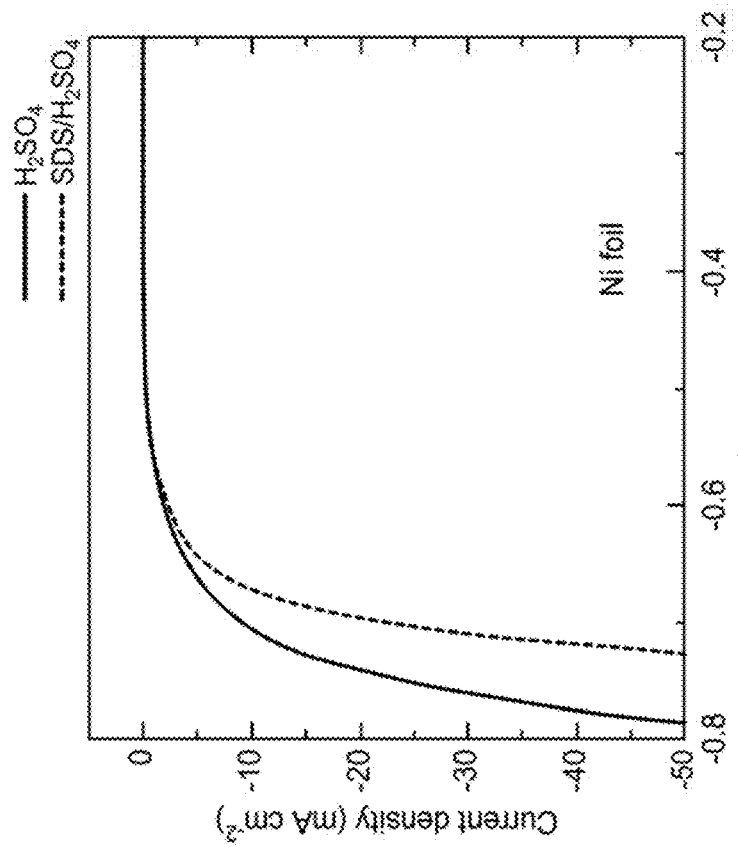
FIG. 8C shows exemplary data of I$_{EC}$ as a function of applied potential vs RHE for an example ML MoS$_2$, in H$_2$SO$_4$ electrolyte with SDS and without SDS, contacting nickel-foil source and drain electrodes according to at least one aspect of the present disclosure.

FIG. 7C shows exemplary photoluminescence data of an example monolayer $MoS_2$ without electrolyte and without SDS (Ex. 701), an example monolayer $MoS_2$ in aqueous $H_2SO_4$ electrolyte without SDS after 50 cycles (Ex. 702), and an example monolayer $MoS_2$ in aqueous $H_2SO_4$ electrolyte with SDS after an additional 50 cycles (Ex. 703). Both the increase of photoluminescence intensity and the shift of the photoluminescence peak to a higher energy indicate the increased hydrogen-coverage at $V_S$ of the monolayer $MoS_2$. The results shown in FIGS. 7A-7C provide evidence that higher hydrogen-coverage at $V_S$ enhances the catalytic activity of $MoS_2$ and the HER performance. Moreover, the results indicate that SDS can promote the hydrogen-coverage at $V_S$.

FIGS. 8A-8D show exemplary data for the HER current ($I_{EC}$) as a function of applied potential vs RHE for an example monolayer $MoS_2$, in $H_2SO_4$ electrolyte without SDS and with SDS, contacting different materials for the source and drain electrodes. The materials for the source and drain electrodes evaluated are glassy carbon, Cu foil, Ni foil, and Ti foil, as shown in FIG. 8A, FIG. 8B, FIG. 8C, and FIG. 8D, respectively. The results indicate that SDS is also effective to activate these materials as catalysts by, e.g., assisting proton transfer processes.

ASPECTS LISTING

The present disclosure provides, among others, the following aspects, each of which can be considered as optionally including any alternate aspects:

Clause 1. A process for forming a catalyst composition, comprising introducing an electrolyte material and an amphiphile material to a metal chalcogenide to form the catalyst composition.

Clause 2. The process of Clause 1, further comprising introducing a voltage to the to the catalyst composition.

Clause 3. The process of Clause 1 or Clause 2, wherein a first amount of hydrogen atoms absorbed on the metal chalcogenide before introducing the electrolyte material and the amphiphile material is less than a second amount of hydrogen atoms absorbed on the metal chalcogenide after introducing the electrolyte material and the amphiphile material.

Clause 4. The process of any one of Clauses 1-3, wherein the metal chalcogenide comprises a density of chalcogen atom vacancies from about 6% to about 30%, as determined by x-ray photoelectron spectroscopy.

Clause 5. The process of any one of Clauses 1-4, wherein: the electrolyte material comprises an acid; and the amphiphile material comprises an anionic compound.

Clause 6. The process of Clause 4, wherein the acid has a pKa of about 3 or less as determined by potentiometric titration.

Clause 7. The process of any one of Clauses 1-6, wherein the metal chalcogenide is represented by the formula: $ME_2$, wherein: M is a Group 3 to Group 10 metal of the periodic table of elements, and E is a Group 16 element of the periodic table of elements.

Clause 8. The process of Clause 7, wherein: M is selected from the group consisting of Mo, W, Nb, Ni, Fe, V, Cr, Mn, and combinations thereof; and E is selected from the group consisting of S, Se, Te, and combinations thereof Clause 9. The process of any one of Clauses 1-8, wherein the metal chalcogenide is selected from the group consisting of $MoS_2$, $NbSe_2$, $TiS_2$, $ZrS_2$, $HfS_2$, $TaS_2$, $TeS_2$, $ReS_2$, $PtS_2$, $SnS_2$, $SnSe_2$, $TiSe_2$, $ZrSe_2$, $HfSe_2$, $VSe_2$, $TaSe_2$, $TeSe_2$, $ReSe_2$, $PtSe_2$, $TiTe_2$, $ZrTe_2$, $VTe_2$, $NbTe_2$, $TaTe_2$, $WTe_2$, $CoTe_2$, $RhTe_2$, $IrTe_2$, $NiTe_2$, $PdTe_2$, $PtTe_2$, $SiTe_2$, $NbS_2$, $WS_2$, $MoSe_2$, $WSe_2$, $MoTe_2$, and combinations thereof.

Clause 10. The process of any one of Clauses 1-9, wherein the metal chalcogenide is selected from the group consisting of $MoS_2$, $MoSe_2$, $MoTe_2$, $WS_2$, $WSe_2$, $WTe_2$, and combinations thereof.

Clause 11. A catalyst composition, comprising: a metal chalcogenide; an electrolyte material; and an amphiphile material.

Clause 12. The catalyst composition of Clause 11, wherein the metal chalcogenide is in the form of a film comprising 10 or fewer layers.

Clause 13. The catalyst composition of Clause 11 or Clause 12, wherein the metal chalcogenide is in the form of a monolayer film.

Clause 14. The catalyst composition of any one of Clauses 11-13, wherein the metal chalcogenide comprises a density of chalcogen atom vacancies from about 6% to about 30%, as determined by x-ray photoelectron spectroscopy.

Clause 15. The catalyst composition of Clause 14, wherein the density of chalcogen atom vacancies is about 6% to about 17%.

Clause 16. The catalyst composition of any one of Clauses 11-16, wherein: the metal chalcogenide comprises a Group 3 to Group 10 metal of the periodic table of elements and a Group 16 element of the periodic table of elements; the electrolyte material comprises an acid; the amphiphile material comprises an anionic compound; or combinations thereof.

Clause 17. The catalyst composition of Clause 16, wherein: the Group 3 to Group 10 metal is selected from the group consisting of Mo, W, Nb, Ni, Fe, V, Cr, Mn, and combinations thereof and the Group 16 element is selected from the group consisting of S, Se, Te, and combinations thereof.

Clause 18. The catalyst composition of any one of Clauses 11-17, wherein the metal chalcogenide is selected from the group consisting of $MoS_2$, $NbSe_2$, $TiS_2$, $ZrS_2$, $HfS_2$, $TaS_2$, $TeS_2$, $ReS_2$, $PtS_2$, $SnS_2$, $SnSe_2$, $TiSe_2$, $ZrSe_2$, $HfSe_2$, $VSe_2$, $TaSe_2$, $TeSe_2$, $ReSe_2$, $PtSe_2$, $TiTe_2$, $ZrTe_2$, $VTe_2$, $NbTe_2$, $TaTe_2$, $WTe_2$, $CoTe_2$, $RhTe_2$, $IrTe_2$, $NiTe_2$, $PdTe_2$, $PtTe_2$, $SiTe_2$, $NbS_2$, $WS_2$, $MoSe_2$, $WSe_2$, $MoTe_2$, and combinations thereof.

Clause 19. A process for converting water to a conversion product, comprising: introducing an aqueous electrolyte material and an aqueous amphiphile material to a metal chalcogenide to form a mixture comprising a catalyst composition, the aqueous electrolyte material comprising an acid having a pKa of about 3 or less as determined by potentiometric titration; and introducing a voltage to the catalyst composition to form the conversion product.

Clause 20. The process of claim 19, wherein: the metal chalcogenide comprises a Group 3 to Group 10 metal of the periodic table of elements and a Group 16 element of the periodic table of elements; and the aqueous amphiphile material comprises an anionic compound.

Clause 21. A device for hydrogen evolution reaction, comprising: an aqueous electrolyte material; an aqueous amphiphile material; and a multilayer structure, the multilayer structure comprising: a substrate; a source electrode and a drain electrode disposed on at least a portion of the substrate; and a metal chalcogenide disposed on at least a portion of the source electrode and at least a portion of the drain electrode.

Aspects described herein enable formation of catalyst compositions having, e.g., higher catalytic activity than conventional methods. The catalyst compositions can be utilized in various reactions such as hydrogen evolution reactions.

All documents described herein are incorporated by reference herein, including any priority documents and/or testing procedures to the extent they are not inconsistent with this text. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure. As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa, e.g., the terms "comprising," "consisting essentially of," "consisting of" also include the product of the combinations of elements listed after the term.

As used herein, a "composition" can include component(s) of the composition and/or reaction product(s) of two or more components of the composition. Compositions can include reaction intermediates.

As used herein, the indefinite article "a" or "an" shall mean "at least one" unless specified to the contrary or the context clearly indicates otherwise. For example, aspects comprising "a metal chalcogenide" include aspects comprising one, two, or more metal chalcogenides, unless specified to the contrary or the context clearly indicates only one metal chalcogenide is included.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A process for forming a catalyst composition, comprising introducing an electrolyte material and an amphiphile material to a metal chalcogenide to form the catalyst composition.

2. The process of claim 1, further comprising introducing a voltage to the to the catalyst composition.

3. The process of claim 1, wherein a first amount of hydrogen atoms absorbed on the metal chalcogenide before introducing the electrolyte material and the amphiphile material is less than a second amount of hydrogen atoms absorbed on the metal chalcogenide after introducing the electrolyte material and the amphiphile material.

4. The process of claim 1, wherein the metal chalcogenide comprises a density of chalcogen atom vacancies from about 6% to about 30%, as determined by x-ray photoelectron spectroscopy.

5. The process of claim 1, wherein:
the electrolyte material comprises an acid; and
the amphiphile material comprises an anionic compound.

6. The process of claim 5, wherein the acid has a pKa of about 3 or less as determined by potentiometric titration.

7. The process of claim 1, wherein the metal chalcogenide is represented by the formula:

$ME_2$, wherein:
M is a Group 3 to Group 10 metal of the periodic table of elements, and
E is a Group 16 element of the periodic table of elements.

8. The process of claim 7, wherein:
M is selected from the group consisting of Mo, W, Nb, Ni, Fe, V, Cr, Mn, and combinations thereof; and
E is selected from the group consisting of S, Se, Te, and combinations thereof.

9. The process of claim 1, wherein the metal chalcogenide is selected from the group consisting of $MoS_2$, $NbSe_2$, $TiS_2$, $ZrS_2$, $HfS_2$, $TaS_2$, $TeS_2$, $ReS_2$, $PtS_2$, $SnS_2$, $SnSe_2$, $TiSe_2$, $ZrSe_2$, $HfSe_2$, $VSe_2$, $TaSe_2$, $TeSe_2$, $ReSe_2$, $PtSe_2$, $TiTe_2$, $ZrTe_2$, $VTe_2$, $NbTe_2$, $TaTe_2$, $WTe_2$, $CoTe_2$, $RhTe_2$, $IrTe_2$, $NiTe_2$, $PdTe_2$, $PtTe_2$, $SiTe_2$, $NbS_2$, $WS_2$, $MoSe_2$, $WSe_2$, $MoTe_2$, and combinations thereof.

10. The process of claim 1, wherein the metal chalcogenide is selected from the group consisting of $MoS_2$, $MoSe_2$, $MoTe_2$, $WS_2$, $WSe_2$, $WTe_2$, and combinations thereof.

11. A catalyst composition, comprising:
a metal chalcogenide;
an electrolyte material; and
an amphiphile material.

12. The catalyst composition of claim 11, wherein the metal chalcogenide is in the form of a film comprising 10 or fewer layers.

13. The catalyst composition of claim 11, wherein the metal chalcogenide is in the form of a monolayer film.

14. The catalyst composition of claim 11, wherein the metal chalcogenide comprises a density of chalcogen atom vacancies from about 6% to about 30%, as determined by x-ray photoelectron spectroscopy.

15. The catalyst composition of claim 14, wherein the density of chalcogen atom vacancies is about 6% to about 17%.

16. The catalyst composition of claim 11, wherein:
the metal chalcogenide comprises a Group 3 to Group 10 metal of the periodic table of elements and a Group 16 element of the periodic table of elements;
the electrolyte material comprises an acid;
the amphiphile material comprises an anionic compound; or
combinations thereof.

17. The catalyst composition of claim 16, wherein:
the Group 3 to Group 10 metal is selected from the group consisting of Mo, W, Nb, Ni, Fe, V, Cr, Mn, and combinations thereof; and
the Group 16 element is selected from the group consisting of S, Se, Te, and combinations thereof.

18. The catalyst composition of claim 11, wherein the metal chalcogenide is selected from the group consisting of $MoS_2$, $NbSe_2$, $TiS_2$, $ZrS_2$, $HfS_2$, $TaS_2$, $TeS_2$, $ReS_2$, $PtS_2$, $SnS_2$, $SnSe_2$, $TiSe_2$, $ZrSe_2$, $HfSe_2$, $VSe_2$, $TaSe_2$, $TeSe_2$, $ReSe_2$, $PtSe_2$, $TiTe_2$, $ZrTe_2$, $VTe_2$, $NbTe_2$, $TaTe_2$, $WTe_2$, $CoTe_2$, $RhTe_2$, $IrTe_2$, $NiTe_2$, $PdTe_2$, $PtTe_2$, $SiTe_2$, $NbS_2$, $WS_2$, $MoSe_2$, $WSe_2$, $MoTe_2$, and combinations thereof.

19. A process for converting water to a conversion product, comprising:
introducing an aqueous electrolyte material and an aqueous amphiphile material to a metal chalcogenide to form a mixture comprising a catalyst composition, the aqueous electrolyte material comprising an acid having a pKa of about 3 or less as determined by potentiometric titration; and
introducing a voltage to the catalyst composition to form the conversion product.

20. The process of claim 19, wherein:
the metal chalcogenide comprises a Group 3 to Group 10 metal of the periodic table of elements and a Group 16 element of the periodic table of elements; and
the aqueous amphiphile material comprises an anionic compound.

* * * * *